United States Patent
Conlon

(10) Patent No.: US 11,053,818 B2
(45) Date of Patent: Jul. 6, 2021

(54) CRYOGENIC COMBINED CYCLE POWER PLANT

(71) Applicant: William M. Conlon, Palo Alto, CA (US)

(72) Inventor: William M. Conlon, Palo Alto, CA (US)

( * ) Notice: Subject to any disclaimer, the term of this patent is extended or adjusted under 35 U.S.C. 154(b) by 0 days.

(21) Appl. No.: 16/458,831

(22) Filed: Jul. 1, 2019

(65) Prior Publication Data
US 2020/0056511 A1  Feb. 20, 2020

Related U.S. Application Data

(63) Continuation of application No. PCT/US2017/067360, filed on Dec. 19, 2017.

(60) Provisional application No. 62/489,129, filed on Apr. 24, 2017, provisional application No. 62/484,182, filed on Apr. 11, 2017, provisional application No. 62/441,819, filed on Jan. 3, 2017.

(51) Int. Cl.
*F01K 19/00* (2006.01)
*F01K 11/00* (2006.01)
(Continued)

(52) U.S. Cl.
CPC ............. *F01K 19/00* (2013.01); *F01K 7/02* (2013.01); *F01K 9/00* (2013.01); *F01K 11/00* (2013.01);
(Continued)

(58) Field of Classification Search
CPC ... F01K 19/00; F01K 9/00; F01K 7/02; F01K 11/00; F01K 13/00; F01K 25/06;
(Continued)

(56) References Cited

U.S. PATENT DOCUMENTS 2,653,447 A * 9/1953 Heller ................... F01K 23/103
60/655
3,974,642 A * 8/1976 Pacault ..................... F01K 3/08
60/39.182
(Continued)

FOREIGN PATENT DOCUMENTS

JP    H04127850 A    4/1992
WO   2015/138817 A1  9/2015

OTHER PUBLICATIONS

International Search Report corresponding to PCT/US17/67360, dated Aug. 3, 2018, 1 page.
(Continued)

*Primary Examiner* — Hoang M Nguyen
(74) *Attorney, Agent, or Firm* — Schmidt Patent Law, Inc.

(57) ABSTRACT

In a cryogenic combined cycle power plant electric power drives a cryogenic refrigerator to store energy by cooling air to a liquid state for storage within tanks, followed by subsequent release of the stored energy by first pressurizing the liquid air, then regasifying the liquid air and raising the temperature of the regasified air at least in part with heat exhausted from a combustion turbine, and then expanding the heated regasified air through a hot gas expander to generate power. The expanded regasified air exhausted from the expander may be used to cool and make denser the inlet air to the combustion turbine. The combustion turbine exhaust gases may be used to drive an organic Rankine bottoming cycle. An alternative source of heat such as thermal storage, for example, may be used in place of or in addition to the combustion turbine.

18 Claims, 14 Drawing Sheets

(51) Int. Cl.
  *F01K 13/00* (2006.01)
  *F01K 25/06* (2006.01)
  *F01K 9/00* (2006.01)
  *F01K 7/02* (2006.01)

(52) U.S. Cl.
  CPC .............. *F01K 13/00* (2013.01); *F01K 25/06* (2013.01); *F01K 9/003* (2013.01)

(58) Field of Classification Search
  CPC .......... F01K 9/003; F01K 23/10; F01K 25/08; F02C 6/16; F02C 6/18; F02C 1/00; F02C 3/00; Y02E 20/16; Y02E 60/15; F25J 2210/40; F25J 2240/90; F25J 1/0202; F25J 1/0236; F25J 1/0022; F25J 1/0012; F25J 1/0052; F25J 1/007; F25J 1/0228; F25J 1/0251; F17C 9/04
  USPC ....................... 60/39.182, 655, 653, 677–679
  See application file for complete search history.

(56) References Cited

U.S. PATENT DOCUMENTS

| | | | |
|---|---|---|---|
| 4,753,077 A * | 6/1988 | Rosenblatt | F01D 1/023 60/661 |
| 4,760,705 A | 8/1988 | Yogev et al. | |
| 5,241,825 A * | 9/1993 | Collin | F01K 23/061 60/39.182 |
| 6,065,280 A | 5/2000 | Ranasinghe et al. | |
| 6,167,706 B1 | 1/2001 | Bronicki et al. | |
| 6,571,548 B1 | 6/2003 | Bronicki et al. | |
| 6,964,168 B1 * | 11/2005 | Pierson | F01K 25/08 60/651 |
| 7,284,363 B2 * | 10/2007 | Kung | F01K 21/00 60/39.182 |
| 7,770,376 B1 | 8/2010 | Brostmeyer | |
| 8,438,849 B2 * | 5/2013 | Kaplan | F01K 25/08 60/653 |
| 2003/0005698 A1 | 1/2003 | Keller | |
| 2009/0158739 A1 | 6/2009 | Messmer | |
| 2015/0184590 A1 | 7/2015 | Conlon | |

OTHER PUBLICATIONS

The extended European Search Report corresponding to EP17890019.7 dated Sep. 22, 2020, 5 pages.
From the International Searching Authority, Written Opinion of the International Searching Authority corresponding to PCT/US17/67360, dated Mar. 8, 2018, 15 pages.
International Search Report corresponding to PCT/US17/67360, dated Mar. 8, 2018, 3 pages.

* cited by examiner

FIG. 4
| FIG. 4A | FIG. 4B |
FIG. 4A
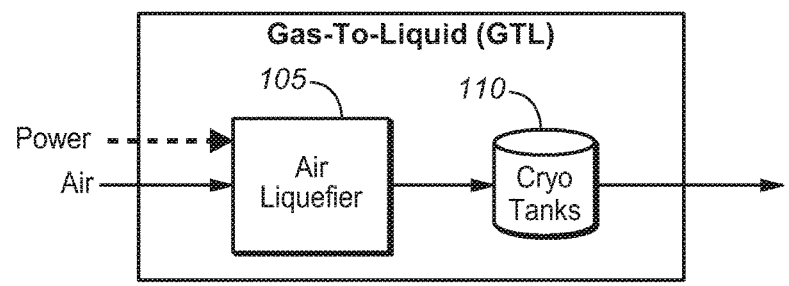
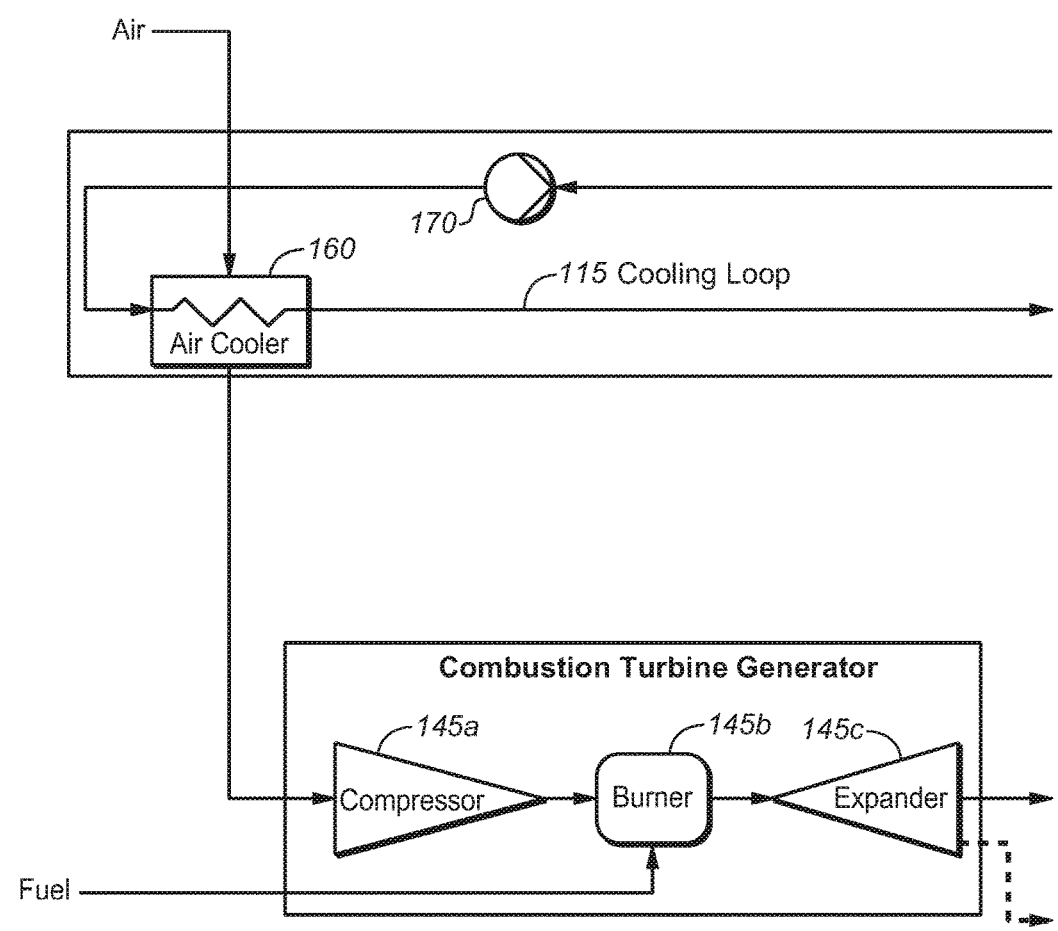

FIG. 6A
| FIG. 6A-1 | FIG. 6A-2 |
FIG. 6A-1
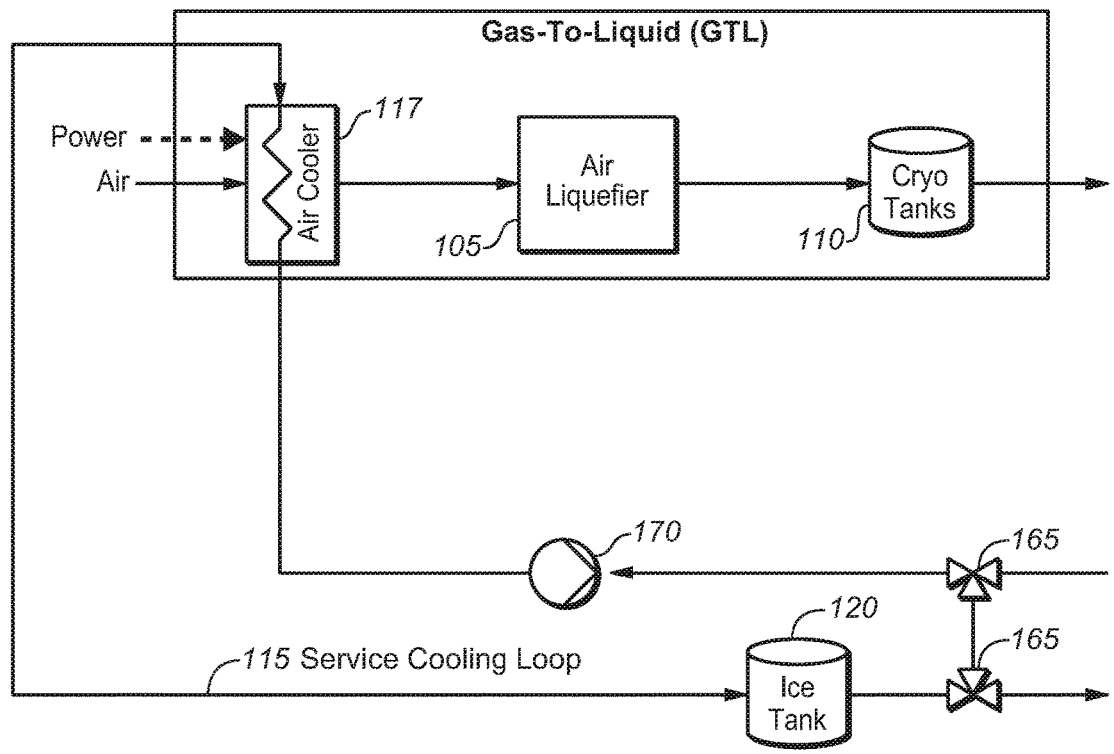
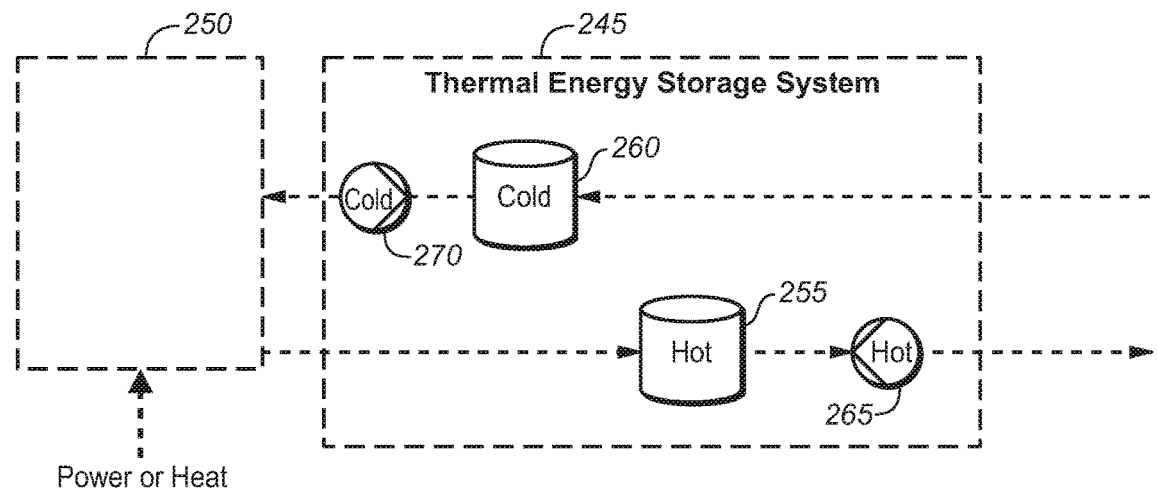

FIG. 6B
| FIG. 6B-1 | FIG. 6B-2 |
FIG. 6B-1
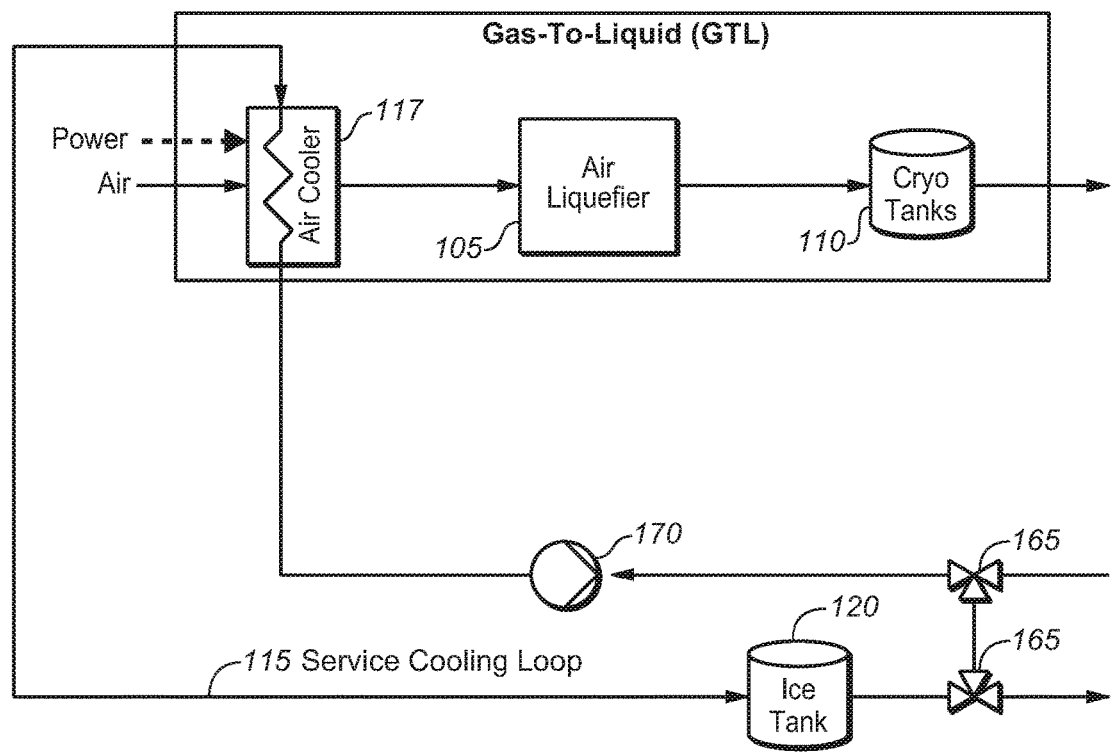
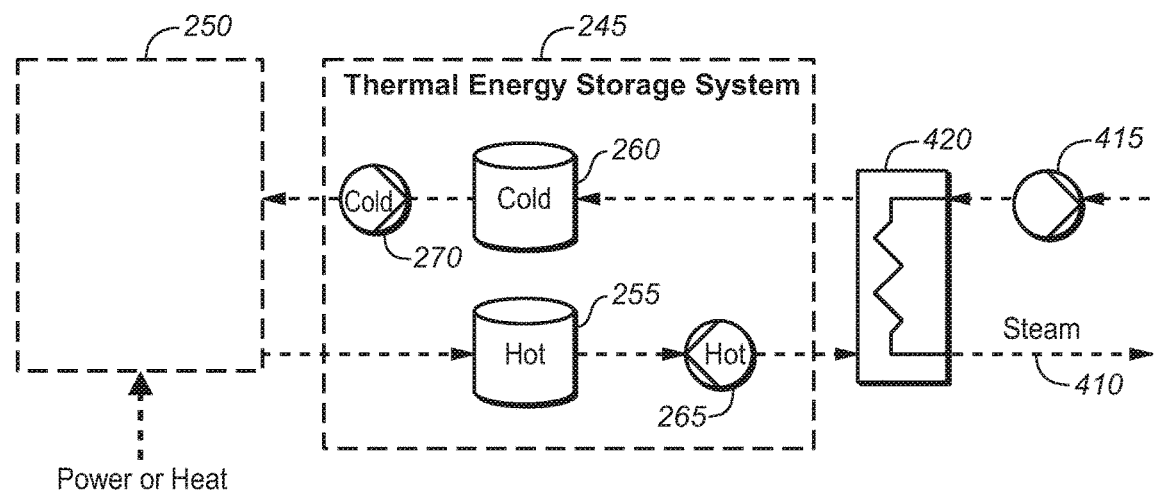

CRYOGENIC COMBINED CYCLE POWER PLANT

CROSS REFERENCE TO RELATED APPLICATIONS

This application is a continuation of International Patent Application No. PCT/US17/67360 titled "Cryogenic Combined Cycle Power Plant" and filed Dec. 19, 2017, which claims benefit of priority to U.S. Provisional Patent Application No. 62/489,129 titled "Cryogenic Combined Cycle Power Plant" and filed Apr. 24, 2017; U.S. Provisional Patent Application No. 62/484,182 titled "Cryogenic Combined Cycle Power Plant" and filed Apr. 11, 2017; and U.S. Provisional Patent Application No. 62/441,819 titled "Cryogenic Combined Cycle Power Plant" and filed Jan. 3, 2017. Each of the applications identified in this paragraph is incorporated herein by reference in its entirety.

FIELD OF THE INVENTION

The invention relates generally to storing energy by liquefying air or another gas or gaseous mixture, and subsequently recovering stored energy upon regasifying the liquid.

BACKGROUND

Solar generation of electricity can depress the grid load at mid-day, resulting in over-generation, followed by steep ramps that can currently be met only with natural gas powered generation. Rapid solar adoption has accelerated these problems, which are expected to arise wherever there is high penetration of renewables. Bulk energy storage is needed to avoid curtailment of solar power, maintain grid stability, and cut fossil fuel consumption.

Further, because of its low cost and availability as a result of the 'shale gas revolution' from horizontal drilling and hydraulic fracturing, natural gas is an increasingly important energy source for electric power generation. Efficient combined cycle power plants (CCPPs) burning natural gas are displacing coal-fired power plants due to economics and because of concerns about climate change due to carbon dioxide emissions. In addition, the increasing amounts of variable wind and solar renewable generation have driven base load coal and nuclear plants out of the merit order, to be replaced by gas-fired plants that can flexibly meet the mismatch between varying load and varying generation.

In North America, natural gas is delivered by an extensive gas pipeline infrastructure, but the increasing demand for natural gas may result in supply shortages that could impact the reliability of the electric power system. For example, the northeastern United States may endure events such as the 'Polar Vortex', when natural gas needed for space heating may limit the availability of natural gas for power generation. The gas supply system can also face constraints from loss of pipeline or storage capacity, due to natural or human caused events. For example, the leak at the Aliso Canyon underground gas storage reservoir in Southern California limited the capacity of natural gas fired power plants in the Los Angeles basin because of fuel shortages. Such events can reduce reliability of the local power grid, potentially causing service disruptions such as brown-outs and black-outs.

Market conditions can also introduce potential electric reliability issues for power plants that may be subject to variability in the cost of natural gas fuel, which is delivered from the pipeline on a 'just-in-time' basis. Long-term take-or-pay style contracts can secure a guaranteed fuel supply at a known cost, but many power plants operate in day-ahead energy markets, and cannot make long-term purchase commitments for fuel. The cost of natural gas fuel delivered to these power plants will vary with market conditions, and may be unavailable due to allocation of pipeline capacity to long-term customers, or may be prohibitively expensive.

Concerns about natural gas fuel supplies and costs can be addressed by liquefying the natural gas for compact storage at the power plant, to secure the fuel supply for electric grid reliability, provide a hedge against short-term price spikes, and to potentially purchase gas at periods of lower demand and price, in order to arbitrage the fuel cost.

SUMMARY

In one aspect, in a cryogenic combined cycle power plant electric power drives a cryogenic refrigerator to store energy by cooling air to a liquid state for storage within tanks, followed by subsequent release of the stored energy by first pressurizing the liquid air, then regasifying the liquid air and raising the temperature of the regasified air at least in part with heat exhausted from a combustion turbine, and then expanding the heated regasified air through a hot gas expander to generate power. After expansion, the low pressure regasified air may be exhausted to atmosphere. The cryogenic combined cycle power plant thus operates as an energy storage system using liquid air as the storage medium. Power (e.g., electric power) may be generated with both the combustion turbine as a topping cycle, and the hot gas expander as a bottoming cycle.

The cryogenic combined cycle power plant may further use the expanded regasified air and the combustion turbine exhaust gases to drive an organic Rankine bottoming cycle.

The cryogenic combined cycle power plant may incorporate intermediate temperature thermal energy storage, such as water or dry ice, produced during the regasification of air or following expansion of pressurized regasified air to aid in the subsequent liquefaction of air to charge energy storage. The expanded regasified air may also be used to densify the inlet air of a combustion turbine by thermal or momentum transfer or may use cold from the liquid air to chill the inlet air.

The cryogenic power plant may liquefy natural gas by heat exchange with the liquid air, store the liquid natural gas, then regasify the liquid natural gas to form a gaseous fuel that is combusted in the combustion turbine.

In another aspect, the combustion turbine in the combined cycle power plant described above may be replaced with another heat source, for example another source of hot combustion gases or a hot thermal energy storage system, or steam from a process or thermal power plant to provide heat to regasify the liquid air energy storage medium.

In another aspect, a method of operating an organic Rankine cycle power plant comprises heating an organic working fluid to convert the organic working fluid from liquid to gaseous phase and heating the gaseous phase organic working fluid, expanding the heated gaseous organic working fluid through a first turbine to generate power, condensing a first portion of the gaseous organic working fluid exhaust from the first turbine from gas phase to liquid phase at a first pressure, expanding a second portion of the gaseous organic working fluid exhaust from the first turbine through a second turbine to produce additional power, condensing at least a first portion of the gaseous working fluid exhaust from the second turbine from gas phase to liquid phase at a second pressure lower than the first pressure, pumping the condensed first portion of the organic working fluid exhaust from the second turbine to the first pressure and combining it with the condensed first portion of the organic working fluid exhaust from the second turbine, then pumping the combined condensed portions of organic working fluid to a third pressure higher than the first pressure, and heating the combined condensed portions of organic working fluid at the third pressure to convert it to gaseous phase and then expanding it through the first turbine.

In another aspect, a method of storing and recovering energy comprises liquefying natural gas and storing the liquid natural gas, regasifying the liquid natural gas to form a gaseous fuel, compressing a first stream of gaseous air, combusting the compressed gaseous air with the gaseous fuel to form a hot gaseous working fluid, expanding the hot gaseous working fluid through a first turbine to form an exhaust gas stream and generate power, producing liquid air in an electrically powered liquefaction process and storing the liquid air, pressurizing the liquid air, heating the pressurized liquid air to produce a second stream of gaseous air and heating the second stream of gaseous air, at least in part using heat from the exhaust gas stream from the first turbine, and expanding the heated second stream of gaseous air through a second turbine to generate additional power.

Liquefying the natural gas may comprise cooling and condensing the natural gas by heat exchange with the liquid air.

In another aspect, a method of storing and recovering energy comprises producing liquid air in an electrically powered liquefaction process and storing the liquid air, pressurizing the liquid air, heating at least a portion of the pressurized liquid air to produce gaseous air and then heating the gaseous air, at least in part using heat provided by heat exchange between steam and the liquid or gaseous air, and expanding the heated gaseous air through a first turbine to generate power. The method further comprises heating an organic working fluid to convert the organic working fluid from liquid to gaseous phase and then heating the gaseous phase organic working fluid, at least in part using heat provided by heat exchange between steam and the organic working fluid, expanding the heated gaseous organic working fluid through a second turbine to generate additional power, and condensing at least a first portion of the gaseous organic working fluid exhaust from the second turbine from gas phase to liquid phase by transferring heat from the first portion of gaseous organic working fluid exhaust from the second turbine to the liquid air or gaseous air during heating of the liquid air or the gaseous air.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 4, FIG. 4A, and FIG. 4B schematically depict another example cryogenic combined cycle power plant.

FIG. 6A, FIG. 6A-1, and FIG. 6A-2 schematically depict an example cryogenic combined cycle power plant comprising a thermal energy storage system.

FIG. 6B, FIG. 6B-1, and FIG. 6B-2 schematically depict an example cryogenic combined cycle power plant that is a variation of the example of FIG. 6A, FIG. 6A-1, and FIG. 6A-2.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

Figure 1:
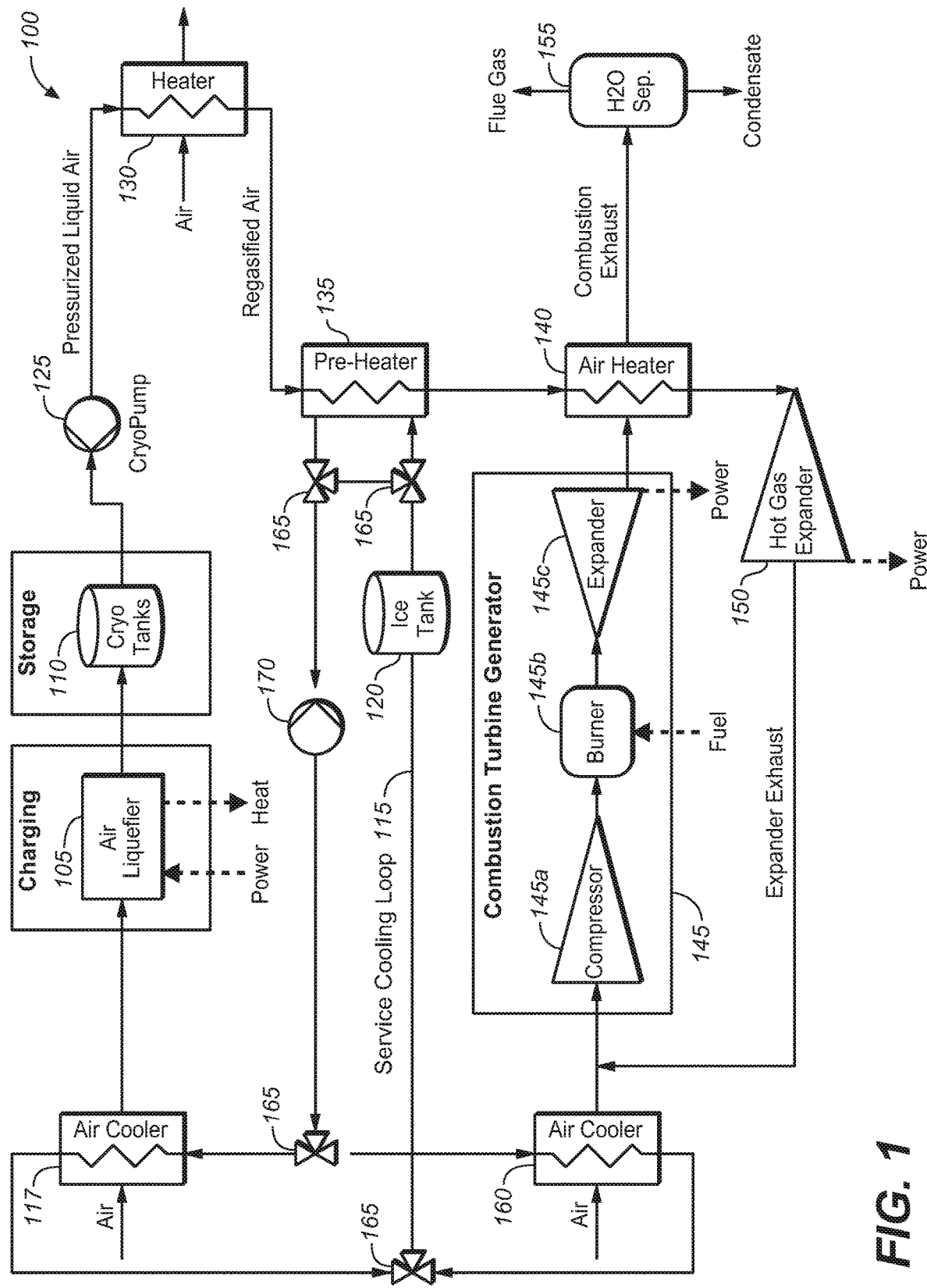
FIG. 1 schematically depicts an example cryogenic combined cycle power plant.

FIG. 1 depicts an example cryogenic combined cycle power plant 100. A liquefaction system comprising an air liquefier 105 and insulated cryotanks 110 stores electric energy by cooling air to cryogenic temperatures to produce liquid air, which is stored within the cryotanks. Generally, the liquefaction and regasification of air take place at different times, storing electric energy at times when it is in surplus and/or at low cost, and producing electric energy at times when it is needed or costly. Pre-cooling of ambient air entering the liquefaction system may be achieved by circulating a heat transfer fluid through service cooling loop 115 to air cooler 117, for example. The heat transfer fluid is cooled by melting ice (e.g., in ice tank 120) produced during the previous discharge cycle as described below. The cold ice storage may also be used to assist with cooling within the liquefaction system as well as to absorb heat rejected during cryogenic refrigeration.

To generate power, the liquid air is pressurized by cryopump 125 and then heated and optionally vaporized in heater 130 using heat from the environment or waste heat from another process (not shown). The heated liquid air or vaporized air exiting heater 130 may be further heated in pre-heater 135 by a heat transfer fluid used to produce ice, which may for example be stored in ice tank 120 for use in the service cooling loop. The ice may be used to assist the liquefaction system as described above, for example, reducing its energy input requirements. The ice may be pure water ice, freezing at 0° C., or may be frozen from a brine at a temperature below 0° C., or the ice may also be produced by freezing other substances, such as carbon dioxide, in order to provide cooling at a lower temperature that may be desirable for liquefaction of air. Pre-heater 135 may vaporize the liquid air, for example if heater 130 is absent or if heater 130 heats but does not vaporize the liquid air. Both heater 130 and pre-heater 135 are optional. Either or both may be absent in some variations.

The regasified air is then heated in air heater 140 (or the liquid air is vaporized and further heated in air heater 140) by combustion gases exhausted from a combustion turbine 145. The regasified air, which has a temperature less than the temperature of the combustion turbine exhaust gas, then expands through a hot gas expander (e.g., turbine) 150 to produce power. After expansion through expander 150 the air may be discharged directly to atmosphere, or directed into the combustion turbine inlet (e.g., as shown in FIG. 1), where the expanded discharge air may be combined with air drawn from the surrounding atmosphere.

After giving up heat to warm the regasified liquid air, the combustion turbine exhaust gas may be further cooled below the dew point in order to absorb additional heat by condensing the water of combustion in condenser (H2O separator) 155. The condensate may be separated from the vapor, and may be treated for use, such as evaporative cooling of the liquefaction system.

During discharge, the flow rate of liquid air is limited by the heat available to evaporate and heat air to the desired expander inlet temperature, and the pressure of the liquid air is determined by the desired expander discharge temperature. By providing additional heat for evaporation, more liquid air flow can be consumed to produce more power from stored energy. For example, heat from the environment, which is warmer than the liquid air, waste heat from another process, or supplemental firing of the combustion turbine exhaust using a duct burner can provide additional heating. The expander discharge temperature may be less than the ambient air temperature and may be used to cool the air entering the combustion turbine either directly by mixing, or indirectly through a heat exchanger. The expander discharge air may cool a heat transfer fluid which cools combustion turbine inlet air or which supplements the ice storage (e.g., ice tank 120).

The mass flow rate of liquid air may be varied in response to the need for power from the storage system, by means of a variable speed cryopump, or by use of a valve to recirculate a fraction of the pumped liquid air to the cryotank. If the hot gas expander is a turbo-machine, which passes a more or less constant volumetric flow rate, a reduced mass flow rate will necessitate a reduction of the expander inlet pressure so the air density is reduced in proportion. The lower pressure ratio across the expander would result in a higher expander discharge temperature, which may be disadvantageous if the discharge air is fed to the combustion turbine inlet.

The combustion turbine, typically operating in a Brayton cycle, is of standard configuration, and draws air through a compressor section 145A, heats compressed air by combusting it with fuel in a burner section 145B, and then produces power by expanding the heated compressed air through an expander (e.g., turbine) 145C. In single shaft configurations, the compressor is driven by the turbine, with excess torque delivered to a load, possibly via a gearbox, to produce useful work including electric power. In multiple shaft configurations, the expansion section may be split into multiple sections, with one section driving the compressor, and the other section driving the load. Many other turbine configurations are possible and suitable.

The single-shaft combustion turbine producing synchronous electric power rotates at a fixed RPM established by the grid frequency and adjusted for gear ratios and the number of poles in the generator. At fixed speed, the combustion turbine is a volumetric machine, meaning the volumetric flow rate is approximately constant. The mass flow rate depends accordingly on the density of the inlet air.

Figure 2:
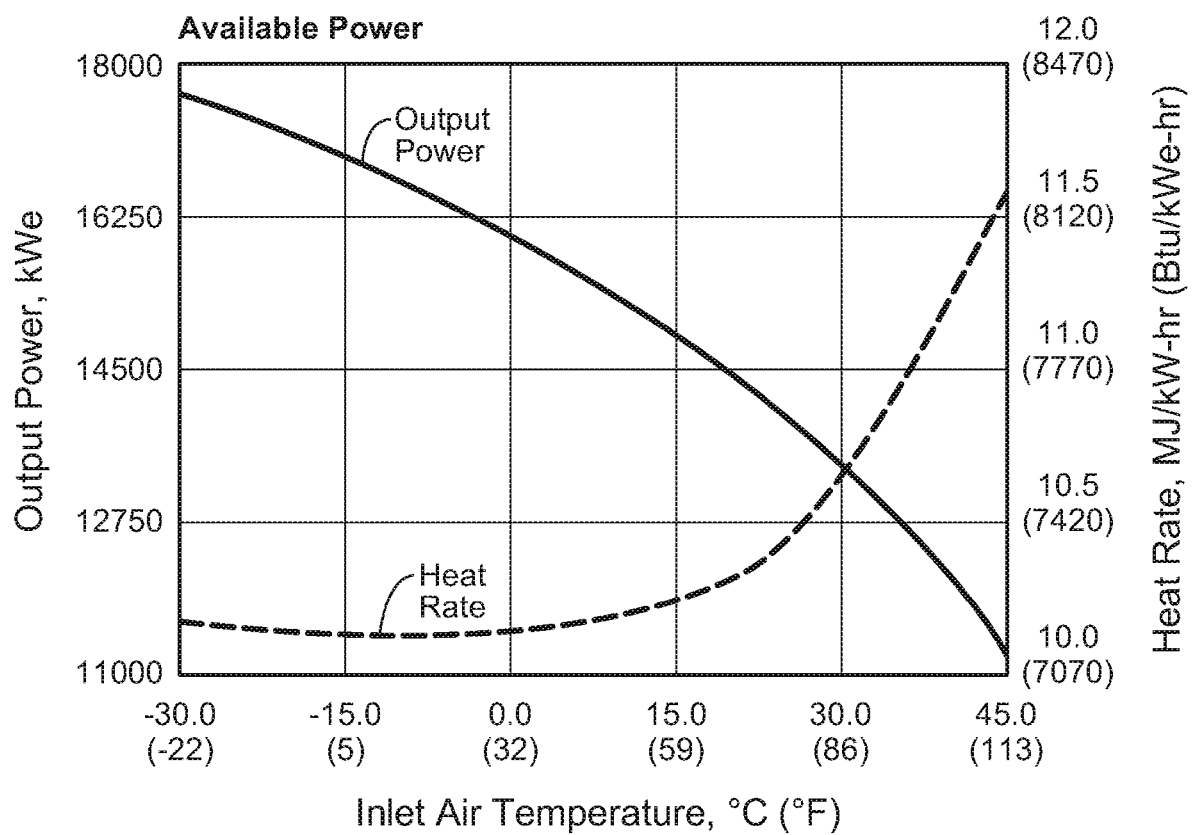
FIG. 2 shows an example dependence of output power and heat ratio on the inlet air temperature to a combustion turbine.

Combustion turbine power output and efficiency is rated at standard (ISO) conditions, typically 15° C. at sea level atmospheric pressure. As the air density decreases, because the temperature or elevation increases, the mass flow rate, power output, and efficiency decrease. Contrariwise, as the air density increases, the mass flow rate and power output increase, and efficiency may also increase. These effects are illustrated in FIG. 2, which show the influence of inlet temperature on the performance of a Solar Turbines, Inc. model Titan 130 generator set, with an ISO power output rating of 15,000 kW. The peak efficiency for the combustion turbine of FIG. 2 is near −15° C., where the power output is about 17,100 kW. Most combustion turbines also have torque limit, which in the case of the 60 Hz frequency for the example system of FIG. 2, is about 17,750 kW at an inlet temperature of −30° C. Typically, the control system of the combustion turbine generator will limit fuel flow to maintain the torque within limits.

Accordingly it is desirable to increase the density of the combustion turbine inlet air. This may be accomplished by cooling the inlet air by heat exchange. For example, as shown in FIG. 1 inlet air to the combustion turbine may be cooled by circulating a heat transfer fluid through service cooling loop 115 to air cooler 160. (Valves 165 may be used to direct flow of heat exchange fluid through service cooling loop 155 as desired, driven by pump 170). In addition or alternatively, the inlet air may be cooled by mixing with cold air discharged from the hot gas expander. Also, the inlet air density can be increased by raising the air pressure by mixing ambient air with slightly pressurized air discharged from the hot gas expander.

The power section of the combustion turbine is often "choked" with the combustion gases flowing through a part of the power section at the speed of sound. To pass more flow, the pressure must increase, which can be estimated by trial and error, or determined from manufacturer specifications. By trial and error for the example Titan 130 generator set, the combustor exit pressure may be estimated to increase by a factor of 1.108 from 1732 kPa to 1920 kPa, and accordingly the exhaust gas temperature may be found to decrease from 495° C. to approximately 478° C.

Referring again to FIG. 1, several illustrative but nonlimiting embodiments of power plant 100 will be described for the conditions of a Solar Turbines, Inc. Titan 130 combustion turbine generator set operating at sea level with a compressor inlet temperature of −15° C., so that an air flow of 54.8 kg/s is required. It should be understood that other combustion turbines may be used and inlet pressure and temperature may also be adjusted both for the design and for operating conditions. This system may be designed or operated with a range of liquid air flows, some or all of which may be mixed with ambient air, after discharge from a hot gas expander.

Consider first a condition in which all of the combustion turbine inlet air first passes through the hot gas expander, after being heated by combustion turbine exhaust gas to 470° C. Assuming the isentropic efficiency of the hot gas expander is 89%, its inlet pressure must be raised to about 116.7 bar in order to discharge at −15° C., producing about 27.8 MW of shaft power, or about 26.4 MW after allowing 5% for gearbox and generator losses. Combined with the 17.1 MW from the combustion turbine, the system delivers 43.5 MW of electric power, while consuming about 53.7 MW of fuel on a Higher Heating Value basis, for a fuel efficiency of 81%.

Turning now to the process of heating liquid air, about 16.1 MW of heat must be added to raise the temperature of pressurized liquid air to −40° C. using for example heater 130 and pre-heater 135. About 11.2 MW of heat may be added to warm the regasified air from −40° C. to 130° C. using combustion turbine exhaust heat, cooling the exhaust to about 20° C. and condensing about 1.45 kg/s of the water vapor produced during consumption. About 20.4 MW of heat is transferred from the combustion turbine exhaust to heat the regasifed air from 130° C. to 470° C.

Assuming that liquid air production requires 400 watt-hours per kilogram (1.44 MW/kg/s), the electrical energy input to the storage would by about 78.9 MW. The electric ratio (power in divided by power out) is 78.9÷43.5=181.4%. Some of the 16.1 MW of heat added to raise the liquid air to −40° C. may be drawn from the production of stored water ice or dry ice for process cooling or subsequent cooling. The cold storage may also be used to precool air to reduce the power required for liquefaction. For example, if the cold storage provides a 1:1 reduction in power use, then 62.8 MW (78.9−16.1) of electric power would be required, improving the electric ratio to 144.4%.

The cold energy storage as water ice or dry ice could also be used to chill combustion turbine inlet air during periods when liquid air was not flowing, for example during startup or after the liquid air stored in the cryotank was depleted.

The flow rate of liquid air could also be adjusted to be more or less than that required at the inlet to the combustion turbine. Higher liquid air flow rates would result in cooler flue gas, and lower liquid flow rates would result in higher flue gas temperatures.

For example the liquid air flow rate could be adjusted to 35 kg/s and mixed with 19.8 kg/s of ambient air. The 19.8 kg/s of ambient air could be cooled from +15° C. to −15° C. with about 0.6 MW of cooling, provided for example from the cold store.

Alternatively the expander inlet pressure could be increased to about 166 bar to achieve a discharge temperature of about −32° C., so that when blended with ambient air at +15° C. ISO conditions, the combustion turbine inlet air is −15° C. In this case, the expander, at 89% isentropic efficiency would produce about 18.4 MW of shaft work, or 17.5 MW of electric power assuming 5% loss for gearbox and generator. Flue gas would leave the system at about 104° C., so there would be no condensation of the water of combustion. The overall fuel efficiency would be reduced to 64% ((17.1+17.5)÷53.7), and the electric power input (at 1.44 MW/kg/s) would be reduced to 50.4 MW, so the electric ratio is essentially unchanged at 145.6%, and the storage efficiency is reduced to about 35%.

Figure 3:
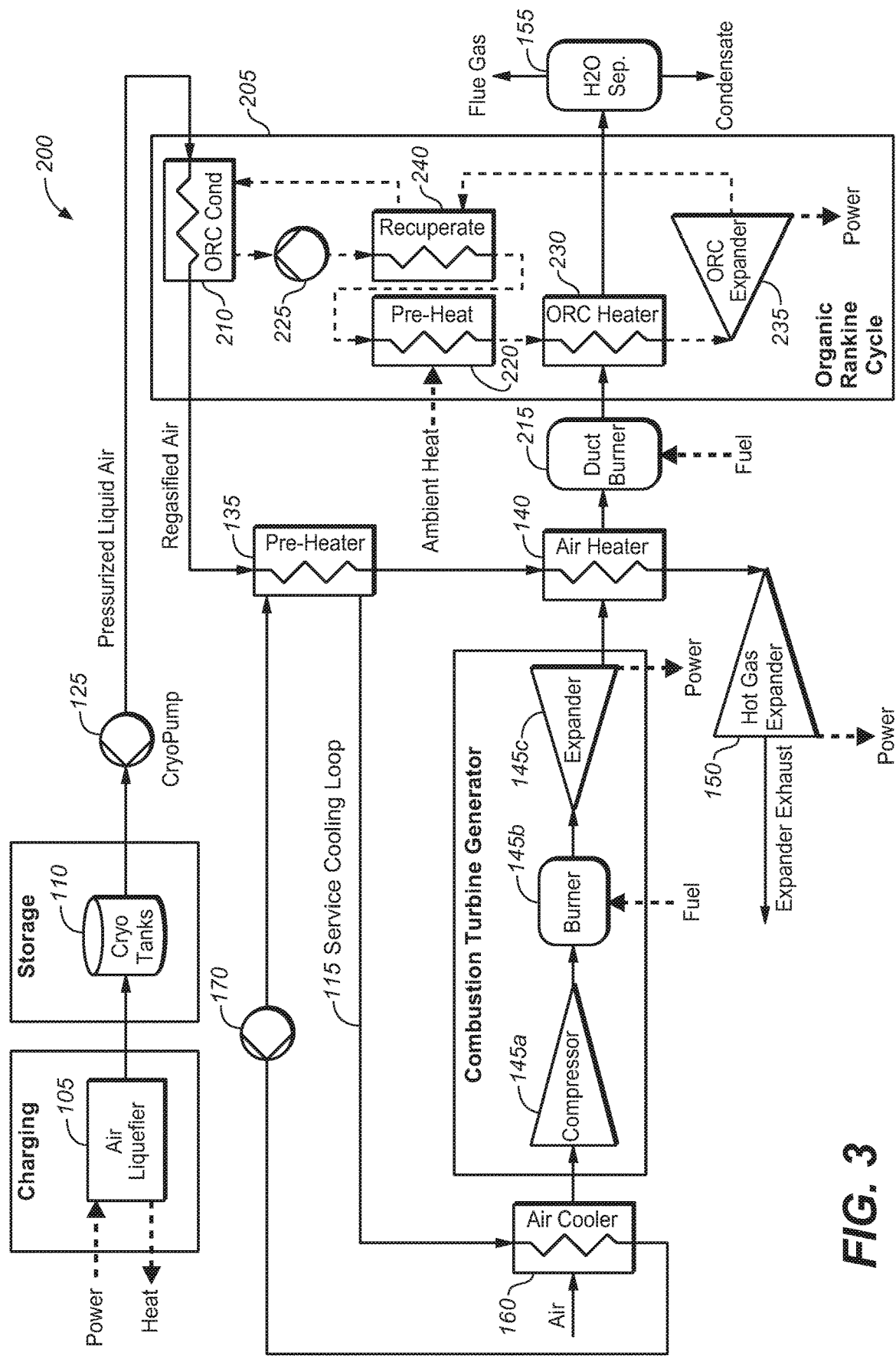
FIG. 3 schematically depicts another example cryogenic combined cycle power plant.

FIG. 3 shows another example cryogenic combined cycle power plant. Power plant 200 depicted in this figure employs an organic Rankine bottoming cycle (ORC) 205, but is otherwise similar in configuration and operation to power plant 100 of FIG. 1. Organic Rankine bottoming cycle 205 produces additional power during discharge, instead of power plant 200 producing ice as in power plant 100.

Organic Rankine cycle 205 rejects heat at low temperature to liquid air in ORC condenser (heat exchanger) 210. In this application, with heat rejection at cryogenic temperature, the ORC efficiency is high, making it more worthwhile to add heat to the cycle to produce more power than to capture cold to reduce the power consumption of the cryogenic liquefaction system. Accordingly heat may be added by supplementary firing with a duct burner 215 as shown in FIG. 3, for example, or waste heat may be gathered from another process.

In the illustrated example, a liquid organic working fluid is pressurized by pump 225 and preheated in recuperator 240. Additional heating in preheater 220 using ambient or available heat is optional before the organic working fluid is further heated (e.g., vaporized and/or superheated) in ORC heater 230. The vaporized organic working fluid is expanded across ORC expander (e.g., turbine) 235 to produce power, and then cooled in recuperator 240 and condensed to a liquid in ORC condenser 210.

Power plant 200 may be arranged and operated so that the discharge from hot gas expander 150 is colder than ambient, in order to cool combustion turbine inlet air, or warmer than ambient to add heat to the ORC. The liquid air can be regasified at a pressure near, above or below its critical point. Regasification near the critical point is undesirable, because small changes of pressure and temperature result in large changes of the specific heat, which could create unstable or meta-stable operation of the condensing section of the ORC. When liquid air is regasified at a pressure below the critical point, two-phase boiling of the liquid air will occur and the ORC efficiency is improved because heat is rejected at lower temperature.

An illustrative but non-limiting embodiment of power plant 200 will now be described that uses a Solar Turbines, Inc. Titan 130 generator set as the combustion turbine generator. The combustion turbine inlet air is chilled to −15° C. to increase the air density and increase the power output to about 17.1 MW and increase the fuel efficiency as was described previously. A further advantage of chilling the combustion turbine inlet air is that the power output is relatively insensitive to weather, which may be useful during hot weather when peaking power is especially valuable.

The inlet air is chilled by circulating a cold heat transfer fluid, such as an antifreeze mixture of 60% ethylene glycol in water through service cooling loop 115 and air cooler 160. About 1.66 MW of heat is transferred to cool air from ISO conditions (15° C.) to −15° C., which would raise the temperature of antifreeze flowing at 15.5 kg/s from about −40° C. to about 0° C.

Exhaust from the combustion turbine is used to warm about 35 kg/s of regasified air to a temperature of 470° C. in air heater 140. This hot regasified air enters hot gas expander 150 at a pressure of 39 bar and expands to atmospheric pressure. Assuming 89% isentropic efficiency, the expander would produce 15.4 MW of shaft power and air would be discharged at about 49.6° C. Assuming 95% efficiency of a gearbox and generator, this expander would deliver about 14.6 MW of electric power. The exhaust air may be further cooled by using it to add heat to the organic Rankine bottoming cycle, or may be discharged to the atmosphere. If the air is further cooled, it may be blended with ambient air and fed into the combustion turbine inlet section, or may be discharged to the atmosphere.

In heating the pressurized regasified air from about 0° C. to about 470° C., the combustion turbine exhaust gas is cooled from about 478° C. to about 181° C. This turbine exhaust air is then reheated to about 317° C. by duct burner 215, consuming about 9.3 MW of fuel. The reheated exhaust gas is used to drive the organic Rankine bottoming cycle, which rejects heat at low temperature to the cryogenic liquid air in ORC condenser 210. The organic Rankine cycle may use R-170 (ethane) or other suitable working fluid. For illustrative and non-limiting purposes, this example assumes the organic working fluid is R-170.

Approximately 18.6 MW of heat is transferred from the re-heated combustion turbine exhaust gas to the R-170 working fluid in ORC heater 230, cooling the exhaust gas to about 36° C., which results in condensation of about 0.66 kg/s of water produced during the combustion of natural gas in the combustion turbine and duct burner. This condensate may be collected in H20 separator 155, treated, and disposed of by evaporation to cool the liquefaction system when it operates.

The R-170 working fluid enters ORC heater 230 at a flow rate of about 20.5 kg/s to absorb heat from the reheated exhaust gas, which warms the organic working fluid to a temperature of about 300° C. The R-170 working fluid then enters ORC expander 235 at a pressure of about 200 bar. In expanding the R-170 working fluid to a pressure of about 1 bar, an expander with an isentropic efficiency of 84% would produce about 9.8 MW of shaft power and the R-170 working fluid would exhaust from the expander at a temperature of about 58° C. Assuming 95% efficiency of gearbox and generator, the ORC expander would deliver about 9.3 MW of electric power.

After being exhausted from ORC expander 235, the R-170 enters recuperator 240 to be cooled to a temperature of about −56° C., transferring heat to the stream of condensed R-170 from ORC condenser 210 by countercurrent heat exchange. The cooled R-170 is then condensed and subcooled to a temperature of about −90° C. in ORC condenser 210 by rejecting heat at a rate of 11.0 MW to heat the cryogenic liquid air.

The condensed R-170 working fluid is pumped by pump 235 to a pressure of about 200 bar to be heated by regenerative heating in recuperator 240. The heated R-170 leaves the recuperator at a temperature of about 0° C., for example, a temperature at which additional heat may be readily added to the R-170 working fluid (using preheater 220, for example) from the ambient, from the regasified air discharged from the hot gas expander, or from another process, to reduce the fuel use in duct burner 215. In one embodiment, about 1 MW of heat is added from ambient air to raise the temperature of the R-170 working fluid about 10° C. in preheater 220, after which the working fluid enters ORC heater 230. In another embodiment, exhaust from Hot Air Expander 150 is cooled to about 15° C., transferring about 1.2 MW of heat to raise the temperature of the R-170 working fluid about 21° C.

Other suitable ORC working fluids, flow rates and temperature and pressure conditions may be selected to provide for efficient power generation with cost-effective heat transfer equipment. For example, the R-170 may condense at lower temperature, with the condenser operating at subatmospheric pressure. The ORC expander inlet pressure and temperature may be adjusted based on the actual isentropic efficiency of the expander and the effectiveness of heat transfer across the recuperator.

Referring again to FIG. 3, the liquid air is pumped to a pressure of about 43 bar and then regasified in ORC condenser 210 by absorbing heat from the condensing R-170 working fluid, leaving the ORC condenser at a temperature of about −57° C. This regasified air is heated to about −16° C. by absorbing heat from the circulating anti-freeze in preheater 135, and then is further heated in air heater 140 by the combustion turbine exhaust gas prior to entering hot gas expander 150.

For the embodiment described above, with a liquid air flow rate of 35 kg/s, approximately 50.4 MW of electric power would be required at an assumed liquefaction rate of 1.44 MW/kg/s. Of course, the actual liquid air production rate and power consumption during charging may be more or less than the consumption rate during discharging, depending on the capacity of the liquefier and the cost of power during liquefaction.

Under these conditions, approximately 40.6 MW of electric power is produced during the discharge of the stored liquid air, an electric ratio (input over output) of 124%. About 63.0 MW of fuel is consumed in the combustion turbine and duct burner, so the fuel Heat Rate is about 5586 kJ/kWh.

Figure 4B:
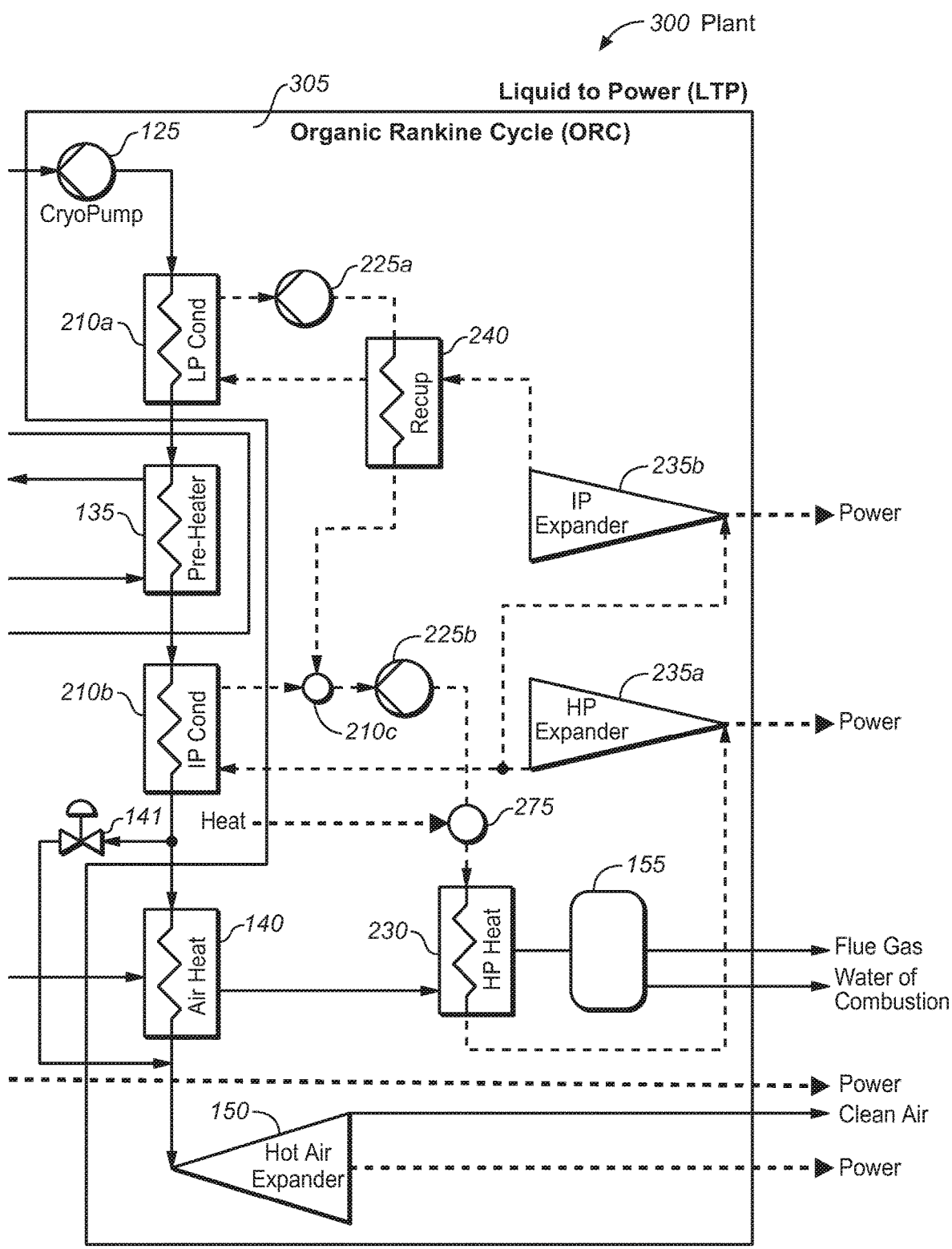

FIG. 4, FIG. 4A, and FIG. 4B show another example cryogenic combined cycle power plant that is a variation of Plant 200 shown in FIG. 3. Power plant 300 depicted in this figure employs a two-pressure organic Rankine bottoming cycle (ORC) 305 to produce power during discharge, and arranges the ORC pumps 225a and 225b in series.

Organic Rankine cycle 305 rejects heat at low temperature to liquid air in low pressure (LP) ORC condenser (heat exchanger) 210a, and also rejects heat at intermediate pressure and temperature in intermediate pressure (IP) ORC condenser (heat exchanger) 210b.

In the illustrated example, a first fraction of organic working fluid is condensed at low pressure in LP condenser 210a and then pumped to intermediate pressure by pump 225a to flow through and be heated in recuperator 240. The balance or second fraction of organic working fluid is condensed at intermediate pressure and temperature in intermediate pressure condenser 210b, and then mixes with the first fraction in location 210c. Location 210c may be a tee at which the fluids meet, or may be for example the well of condenser 210b. Subcooled organic working fluid, which is a mixture of the first fraction and the second fraction is pumped to supercritical pressure by Pump 225b to flow to ORC heater 230. The organic working fluid vaporized in ORC heater 230 is expanded across ORC expander (e.g., turbine) 235a to an intermediate pressure to produce power. An amount of the working fluid exhausted from ORC expander 235a approximately equal to the second fraction of ORC working fluid is directed to IP condenser 210b, and the balance of the working fluid exhausted from ORC expander 235a, approximately equal to the first fraction, is directed to IP expander 235b. The first fraction of ORC working fluid expands from intermediate to low pressure in IP expander 235b to produce power, then flows through recuperator 240 to LP condenser 210a.

As illustrated, the ORC may be configured with a regenerator (recuperator) 240 to further increase the cycle efficiency. Heat exchange in regenerator 240 between the organic working fluid stream from pump 225a and the organic working fluid exhaust from expander 235a warms the high pressure stream and cools the low pressure stream.

Referring again to FIG. 4, FIG. 4A, and FIG. 4B, power plant 300 may be arranged and operated so that the discharge from hot air expander 150 is colder than, warmer than, or about equal to ambient temperature. The discharge temperature from hot air expander 150 is determined by the inlet pressure and temperature of hot air expander 150. For a given temperature and air flow rate, the power produced by hot air expander 150 is proportional to the inlet pressure.

Likewise the power produced by the ORC expanders is proportional to the pressure, temperature and flow rate of the ORC working fluid. For a given pressure and temperature leaving the ORC heater 230, the flow rate is ultimately limited by the heat transfer capability of the condensers 210a and 210b.

Figure 5A:
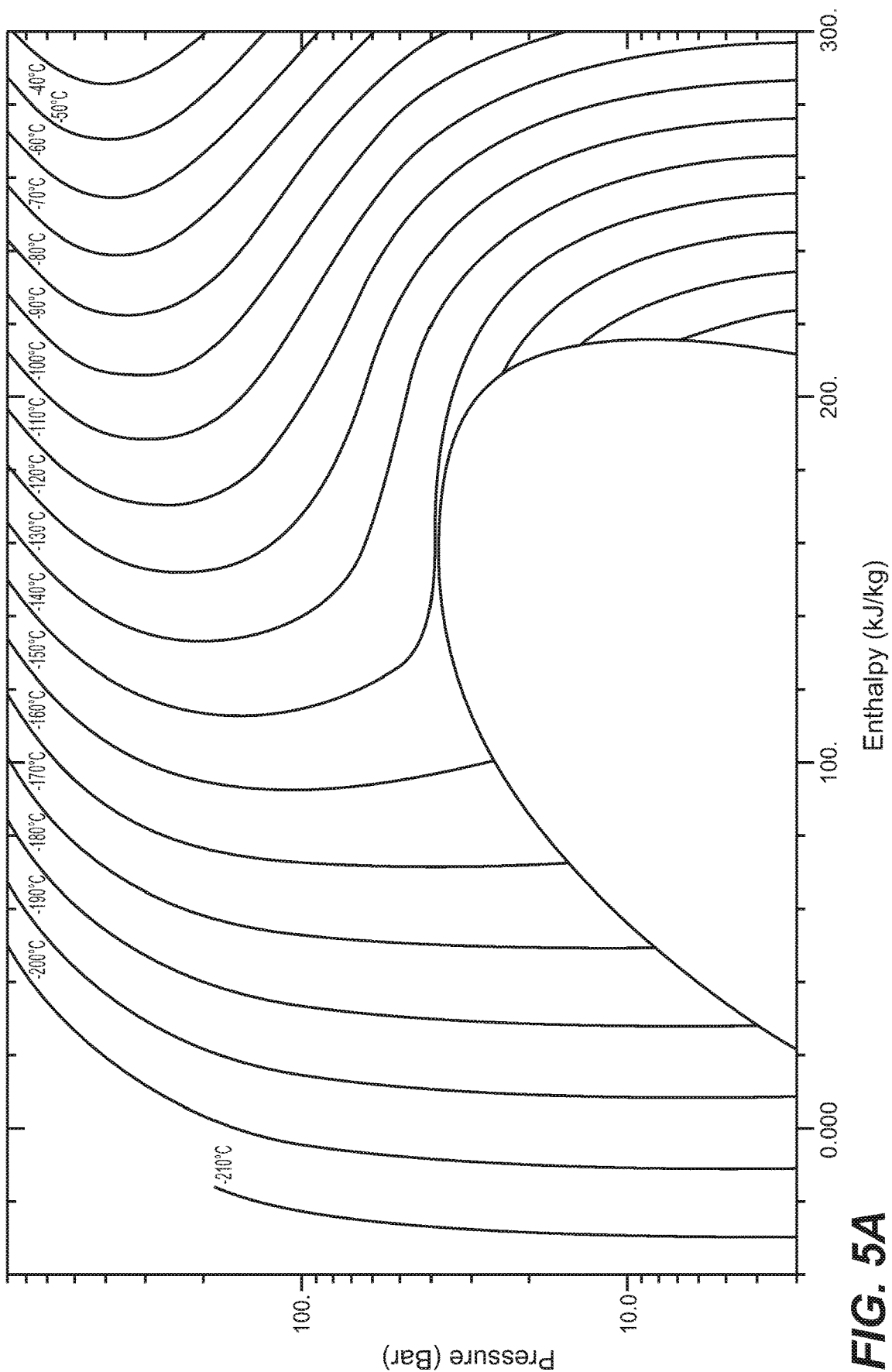
FIG. 5A shows a pressure—enthalpy diagram for air.

FIG. 5a shows the pressure-enthalpy diagram for air with isotherms, or lines of constant temperature. The maximum enthalpy change for a given temperature rise of the liquid air, and hence the amount of heat that could be rejected from the ORC working fluid to regasify the air, occurs at a pressure less than the critical pressure of air. However at higher regasification pressure the amount of work extracted by the hot air expander is greater. These competing factors may be optimized, with a liquid air regasification pressure above or below the critical point. The specific heat changes rapidly near the critical point, which could create unstable or meta-stable operation of the ORC LP Condenser 210a, so regasification near the critical pressure is undesirable.

Figure 5B:
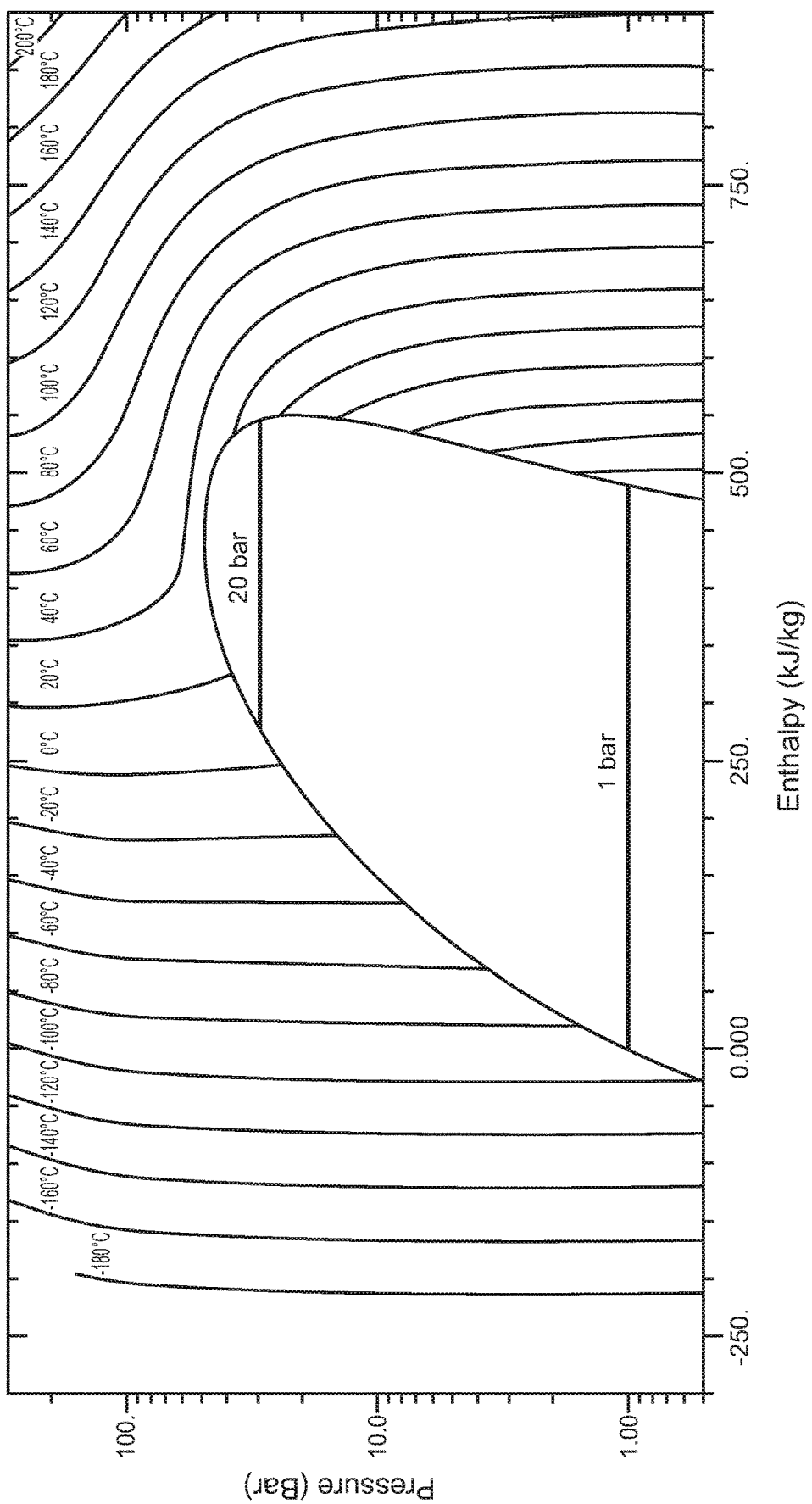
FIG. 5B shows a pressure-enthalpy diagram for ethane.

FIG. 5b shows the pressure-enthalpy diagram for ethane with isotherms, or lines of constant temperature. Condensation occurs at approximately constant temperature and pressure, represented by a horizontal line from saturated vapor on the right to saturated liquid on the left. Saturation lines labeled 20 bar and 1 bar illustrate possible condensation pressures for condensers 210a and 210b, subject to the availability of cooling from the liquid air and regasified liquid air.

Referring again to FIG. 4, FIG. 4A, and FIG. 4B, an illustrative but non-limiting embodiment of power plant 300 will now be described that uses a Solar Turbines, Inc. Titan 130 generator set as the combustion turbine generator. The combustion turbine inlet air is chilled to −15° C. to increase the air density and increase the power output to about 17.1 MW and increase the fuel efficiency as was described previously. A further advantage of chilling the combustion turbine inlet air is that the power output is relatively insensitive to weather, which may be useful during hot weather when peaking power is especially valuable.

The inlet air is chilled by circulating a cold heat transfer fluid, such as an antifreeze mixture of 60% ethylene glycol in water through cooling loop 115 and air cooler 160. About 1.66 MW of heat is transferred to cool air from ISO conditions (15° C.) to −15° C., which would raise the temperature of antifreeze flowing at 15.5 kg/s from about −40° C. to about 0° C.

The antifreeze then circulates to warm regasified air from a temperature of −105° C. to about −63° C. in preheater 135. The temperature of the combustion inlet air may be controlled by regulating the flow rate of anti-freeze, for example increasing the flow rate of anti-freeze when ambient air temperature is warmer, with a corresponding increase of the liquid air flow, or an increase in the temperature of regasified air leaving preheater 135.

Exhaust from the combustion turbine is used to warm about 30 kg/s of regasified air to a temperature of 425° C. in air heater 140. This hot regasified air enters hot air expander 150 at a pressure of 40 bar and expands to about atmospheric pressure. Assuming 89% isentropic efficiency, the expander would produce 12.4 MW of shaft power and air would be discharged at about 27° C. Assuming 95% efficiency of a gearbox and generator to convert shaft power to electric power, this expander would deliver about 11.8 MW of electric power. The clean exhaust air could be blended with ambient air and fed into the combustion turbine inlet section, in which case it might be desirable to reduce the air temperature entering the hot air expander 150, by for example increasing the flow rate of liquid air.

In heating the pressurized regasified air, the combustion turbine exhaust gas is cooled from about 459° C. to about 315° C. The exhaust gas then transfers heat to the high pressure ORC working fluid across heat exchanger 230 to raise the ORC working fluid temperature. The organic Rankine cycle may use R-170 (ethane) or other suitable working fluid. For illustrative and non-limiting purposes, this example assumes the organic working fluid is R-170.

Approximately 23.0 MW of heat is transferred from the combustion turbine exhaust gas to the R-170 working fluid in ORC heater 230, cooling the exhaust gas to about 8° C., which results in condensation of water produced during the combustion of natural gas in the combustion turbine. This condensate is removed in H20 separator 155 at a rate of about 1.8 kg/s, depending on the hydrocarbon mix in the fuel, and may be collected, treated, and disposed of by evaporation, such as to cool the liquefaction system when it operates.

The R-170 working fluid enters ORC heater 230 at a flow rate of about 24 kg/s to absorb heat from the exhaust gas, warming the organic working fluid to a temperature of about 300° C. The R-170 working fluid then enters ORC expander 235a at a pressure of about 180 bar and expands to an intermediate pressure of about 31 bar. At isentropic efficiency of 84%, this expansion would produce about 4.7 MW of shaft power and the R-170 working fluid would exhaust from the expander at a temperature of about 202° C.

About 40% of the R-170 exhausted from ORC expander 235a is extracted and sent to the IP Condenser 210b, with the balance of the R-170 continuing to expand to a pressure of 0.4 bar through ORC expander 235b. Assuming 84% isentropic efficiency of the second expansion process, an additional 5.1 MW of shaft power is produced, and the R-170 exhausts from ORC expander 235b at about 22° C. Assuming 95% efficiency of gearbox and generator, the two stages of expansion together deliver about 9.4 MW of electric power. The fraction of the ORC working fluid exhausted from ORC expander 235a and sent to IP condenser 210b is largely condensed at a saturation temperature of about 9.5° C. in the IP condenser by transfer of about 6.8 MW of heat to regasified air. About 4% of the fluid exiting IP condenser 210b remains as vapor, to be condensed by mixing with subcooled R-170 from the recuperator 240 at location 210c. About 4.5 MW is transferred to cool the ethane to 9.5° C. saturation temperature and 2.4 MW is transferred to condense the R-170. Regasified air from preheater 135 is warmed by this heat transfer from about −66° C. to about 147° C.

The fraction of R-170 exhausted from ORC expander 235b enters recuperator 240 to be cooled to a temperature of about −100° C., transferring about 2.6 MW of heat. The cooled R-170 is then condensed at about −108° C. and subcooled to a temperature of about −111° C. in ORC LP condenser 210a by rejecting heat at a rate of 7.6 MW to regasify the cryogenic liquid air.

The R-170 condensed in ORC LP condenser 210a is pressurized by pump 225a to about 31.5 bar to be heated by regenerative heating in recuperator 240. The 31.5 bar R-170 liquid enters the recuperator 240 at about −109° C. and leaves the recuperator at a temperature of about −34° C., for example. The R-170 from the recuperator 240 mixes with R-170 from IP Condenser 210b at location 210c, which may be a simple tee, a mixer, or may be the well of condenser 210b. The mixture, at a temperature of about −13° C. is then pressurized to about 180 bar by pump 225b, emerging from the pump at about 6° C., assuming 75% adiabatic pump efficiency. At this temperature, additional heat may be added to the R-170 working fluid by optional scavenge heater 275 using heat from the ambient, from the regasified air discharged from the hot gas expander, heat from the parasitic plant loads, or from another process.

Other suitable ORC working fluids, flow rates and temperature and pressure conditions may be selected to provide for efficient power generation with economical heat transfer equipment, or for practical reasons such as increasing the condensing temperature at LP Condenser 210a so the condensation of ORC working fluid is above atmospheric pressure to eliminate potential ingress of atmospheric air. The ORC expander inlet pressure and temperature may be adjusted based on the actual isentropic efficiency of the expander and the effectiveness of heat transfer across the recuperator.

Referring again to FIG. 4, FIG. 4A, and FIG. 4B, the liquid air is pumped to a pressure of about 43 bar and then regasified in ORC condenser 210a by absorbing heat from the condensing R-170 working fluid, leaving the ORC condenser at a temperature of about −105° C. This regasified air is heated to about −63° C. by absorbing heat from the circulating anti-freeze in preheater 135, and then is further heated by absorbing heat of condensation and sensible heat in IP Condenser 201b, and in air heater 140 by absorbing heat from the combustion turbine exhaust gas prior to entering hot gas expander 150.

For the embodiment described above, with a liquid air flow rate of 30 kg/s, approximately 43.2 MW of electric power would be used, at an assumed liquefaction rate of 1.44 MW/kg/s. Of course, the actual liquid air production rate and power consumption during charging may be more or less than the consumption rate during discharging, depending on the capacity of the liquefier and the cost of power during liquefaction.

Capital cost and operating efficiency of plant 400A are influenced by the design of heat exchangers. The approach temperature difference in single-phase heat transfer, or pinch point temperature difference in boiling or condensing heat will impact the design surface area and equipment cost. Off-design conditions, such as changes in ambient air temperature, or degradation of turbo-machinery efficiency, will result in changes to the overall performance, with one or more of the heat exchangers being a limiting device. Table 1 below lists the minimum temperature difference for the various heat exchangers in the embodiment just described and some influences of off-design conditions.

TABLE 1

| Unit Number | Temp Diff. | Effects |
|---|---|---|
| 160 | 15° C. | The minimum approach temperature at the air cooler is between the entering ambient air and the exiting heated coolant. As ambient air temperature increases, this difference would be maintained by increasing the coolant flow rate. |
| 135 | 23° C. | The minimum approach temperature at the air preheater is between the exiting coolant and the exiting regasified air. As ambient temperature increases, this temperature difference would narrow, as the regasified air was heated further to maintain the combustion turbine compressor inlet temperature and flow rate. |
| 210a | 5° C. | The minimum approach temperature at the low pressure ORC condenser is between the entering R-170 and the exiting regasified air. A smaller approach temperature would increase the efficiency. As ambient air temperature increased, ORC cycle conditions (total or extraction flow rate, ORC condensing temperature/pressure) could be adjusted based on the heat transfer capability of this condenser. Alternatively, the pressure of the liquefied air from cryopump 125 could be reduced to lower the boiling point and increase the latent heat of evaporation of the liquid air as illustrated in FIG. 5. |
| 240 | 9° C. | The minimum approach temperature is between the entering R-170 liquid and the exiting R-170 vapor. |
| 230 | 2° C. | The minimum approach temperature is at exit of the high pressure ORC heater, where water vapor is condensing from the flue gas. Adding low grade heat via the optional scavenge heater 275 could be useful and cost-effective. Higher ambient temperature could permit more harvesting of low grade heat from the ambient. If the ORC flow rate was reduced, the difference would widen. |
| 210b | 5° C. | As with the low pressure condenser 210a, a 5° C. pinch point temperature difference was selected. Higher ambient temperature would increase the entering air temperature and necessitate a higher condensing temperature (and extraction pressure) from HP expander 235a or a reduction in the flow rate of R-170. |
| 140 | 24° C. | The minimum approach temperature is at the turbine exhaust inlet and hot regasified air outlet. The temperature of the regasified air would be controlled with bypass valve 141. |

According to FIG. 2, at the ISO rating condition (sea level, 15° C. inlet air) the combustion turbine produces 15 MW at an LHV Heat Rate of 10,230 kJ/kWh, or 42.6 MW. Adjusting for the higher heating value of natural gas (1.106 LHV), the fuel flow is 47.1 MW and the combustion turbine efficiency is 31.8% (without inlet and exit pressure drops).

In the embodiment just described for plant 300, the combustion turbine produces approximately 17.1 MW while consuming 53.7 MW of fuel for an efficiency of 31.8%. An additional 20.4 MW of electric power is produced during the discharge of the stored liquid air (by expanders 150 and 235a/b), using 31.9 MW of heat from the exhaust of the combustion turbine, so the Liquid-To-Power bottoming cycle has a thermal efficiency of 63.9%. The overall efficiency, including both the 53.7 MW of fuel and 43.2 MW of electric power (needed to produce 30 kg/s of liquid air at 400 Wh/kg) is about 38.7%.

From an electric market perspective the marginal energy cost is determined by two figures of merit: Heat Rate, the ratio of fuel input to power output, and Electricity Rate (or E-Rate), the ratio of electricity input to power output. The marginal cost of operation is obtained by multiplying the fuel cost by the Heat Rate and the power cost by the E-Rate. In the example cited above, the Heat Rate would be 5155 MJ/MWh (3600 s/h*1 MJ/MW−s*53.7 MW÷37.4 MW), or 4.892 MMBtu/MWh, and the E-Rate would be 1.15 MWh/MWh. For example, natural gas fuel might cost $4/MMBtu during discharge, and power might cost $20/MWh during charging, which would yield an electric production cost of $42.55/MWh ($4/MMBtu·4.887 MMBtu/MWh+$20/MWh·1.15 MWh/MWh).

The performance of the embodiments of power plants 100, 200, 300 just described is summarized below in Table 2, including marginal energy costs, assuming fuel at $4/MMBtu, charging power at $20/MWh, liquid air production at 400 Wh/kg, and CO2 content at 117 pounds per Million Btu of fuel. The open cycle combustion turbine, represented by the Titan 130 generator set has the lowest marginal energy cost, but the highest CO2 emissions. Plant 100 has the lowest CO2 emissions, but has the highest E-Rate, resulting in the highest marginal power cost under the cost assumptions. Adding the Organic Rankine Cycle as for plants 200 and 300 reduces the emissions and marginal power cost compared to the Open Cycle Titan 130.

TABLE 2

|  | Titan 130 | Plant 100 | Plant 200 | Plant 300 |
| --- | --- | --- | --- | --- |
| Liquid Flow | — | 54.8 kg/s | 35 kg/s | 30 kg/s |
| Power | 15.0 MW | 43.5 MW | 40.6 MW | 37.5 MW |
| Heat Rate |  |  |  |  |
| kJ/kWh | 11314 | 4444 | 5588 | 5155 |
| MMBtu/MWh | 10.726 | 4.213 | 5.298 | 4.887 |
| E-Rate | 0% | 181% | 124% | 115% |
| Marginal Energy Cost | $42.91/MWh | $53.05 | $45.99 | $42.55 |
| Carbon Emissions | 1254 | 493 | 620 | 572 |

This specification teaches that there are two paths to reducing the marginal power cost of plant 100: integration of the cold storage with the liquefaction plant in order to reduce the E-Rate, or addition of a bottoming Organic Rankine Cycle. The Organic Rankine Cycle requires additional heat, which may be provided for example by supplementary firing in a duct burner, as in plant 200, or if no additional heat is to be provided, by reducing the liquid air flow rate, illustrated in both plants 200 and 300. Plant 300 also teaches how to maximize the use of available heat by condensing the ORC working fluid at multiple pressures. This is distinct from combined cycle power plant practice, where the working fluid (water) is boiled at multiple pressures, but condensed at a single pressure determined by ambient cooling.

It may be desirable for environmental reasons to avoid the use of fossil fuel. In such cases the combustion turbine generator of power plant 200 in FIG. 3 or power plant 300 in FIG. 4, FIG. 4A, and FIG. 4B could be replaced by an alternate non-fossil fueled heat source, such as thermal energy storage, as shown in example power plant 400A of FIG. 6A, FIG. 6A-1, and FIG. 6A-2.

Thermal energy storage system 245 in power plant 400A may store heat in any suitable storage medium at any suitable temperature or range of temperatures. For example, the thermal energy storage system may store heat in a low vapor pressure heat transfer fluid (e.g., at a pressure of about one atmosphere) such as, for example, an (e.g., organic) oil or an inorganic molten salt, or in a high vapor pressure heat transfer fluid, or in any other suitable liquid. The thermal energy storage system may store heat in a solid such as, for example, graphite, metals, concrete (e.g., HEATCRETE provided by Heidelberg Cement AG and used in Energy Nest concrete storage modules), or aggregate. The thermal energy storage system may store heat in a gas or vapor such as, for example, steam. The thermal energy storage system may store heat as sensible heat, as latent heat (i.e., via a phase change), or as both sensible heat and latent heat.

Thermal energy storage system 245 may be charged by any suitable heat source 250. For example, solar energy may be collected as heat and stored in the thermal energy storage system, or electric heaters (e.g., resistive or inductive electric heaters) may be used to generate heat for storage, or a fuel (e.g., a fossil fuel) may be combusted to produce the heat. If electric heaters are used, they may be powered with electricity generated with photovoltaic solar cells, with a solar thermal electric power plant, with a wind turbine, with a hydroelectric power plant, using nuclear power, by combusting a fossil fuel, by any suitable combination thereof, or by any other suitable method. The thermal energy storage system may be heated directly (e.g., by embedded electric heaters), or indirectly by a heat transfer fluid that transfers heat from the heat source to storage via a heat exchanger. In the latter case, suitable heat transfer fluids may include, for example, molten salts, steam, and oils, including high vapor pressures oils typically used by parabolic trough concentrating solar power systems.

Figures 2, 6A:
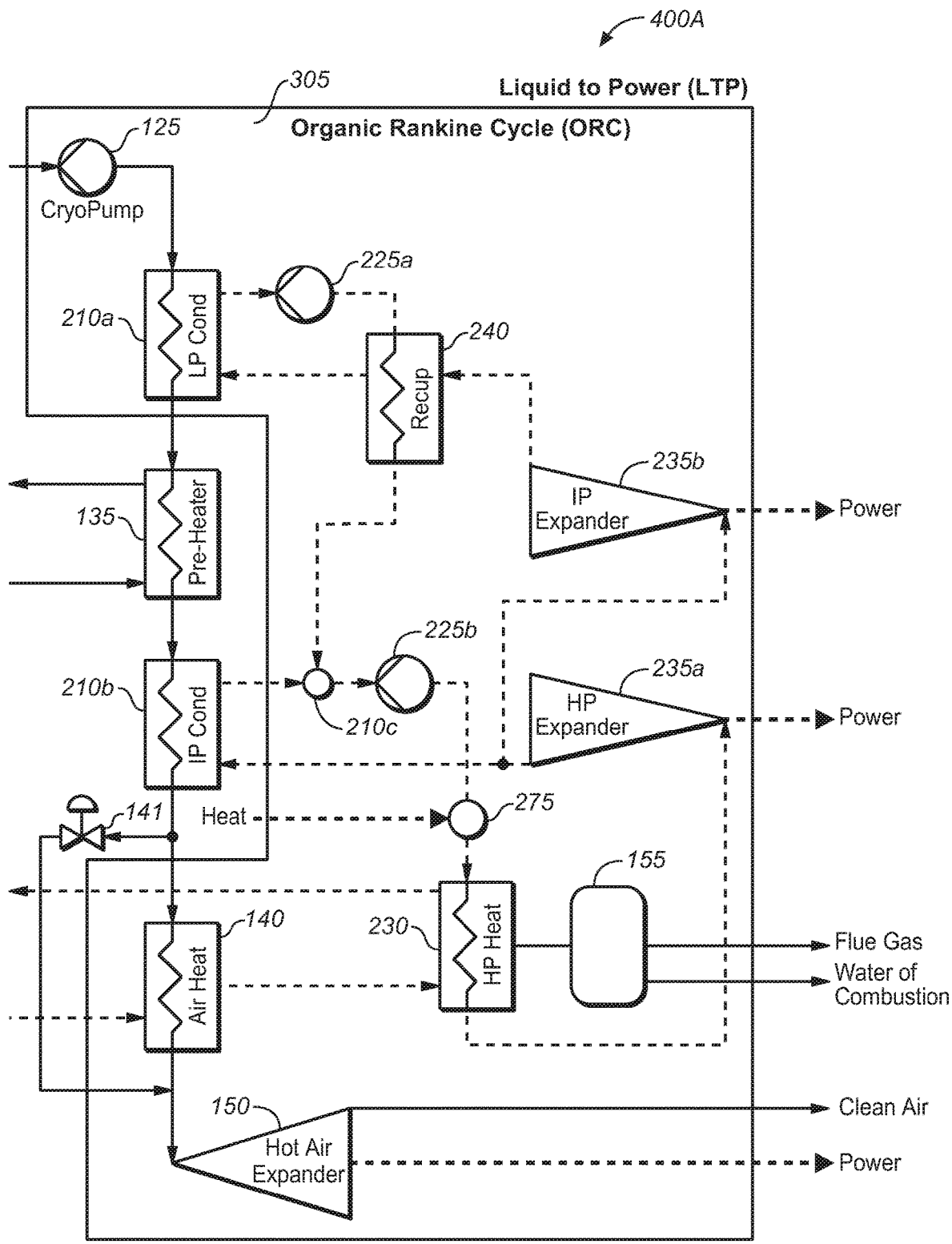

Example thermal energy storage system 245 of FIG. 6A, FIG. 6A-1, and FIG. 6A-2 employs both high temperature storage 255, such as molten salt tanks for example, and low temperature storage 260, such as cryogenic liquid for example. Pump 265 circulates heat transfer fluid from high temperature storage 255 to air heater 140, then to ORC heater 230, then to low temperature storage 260. Pump 270 circulates heat transfer fluid from low temperature storage 260 to heat source 250, then to high temperature storage 255. Any other configuration suitable for thermal energy storage 245 may also be used. Heat source 250 may also provide power and/or heat for other applications in addition to charging thermal energy storage system 245.

With a similar liquid air to power process as described above with respect to power plant 300 of FIG. 4, FIG. 4A, and FIG. 4B, power plant 400A of FIG. 6A, FIG. 6A-1, and FIG. 6A-2 would produce about 20.8 MW of electric power during discharge. Instead of consuming 64.3 MW of fuel, this system would consume about 33.9 MW of heat from the thermal energy storage system to warm the organic Rankine cycle working fluid and liquefied air. The liquid air production consumes 50.4 MW as before, so the overall Electricity Ratio is 405% ((33.9+50.4)÷20.8). As described earlier, the ice tank 120 and Service Cooling Loop 115 would be employed to reduce the Electricity Ratio by cooling the air liquefaction system. Without any fuel and without accounting for efficiency gains from employing the Service Cooling Loop 115, the marginal cost of energy at $20/MWh for power cost is $81.00/MWh. This cost of energy would be competitive if the cost of fuel was very high, such as on islands like Hawaii, or if a carbon tax was imposed.

The operating temperature may be adjusted based on the material limits of the high temperature storage medium. For example a molten salt may be heated to 565° C., which would permit the regasified liquid air to be heated to about 550° C. At the same expander 150 pressure ratio, the air temperature at the expander exhaust would be higher, and could be used to heat the ORC fluid, supplementing heat available from the ambient. Or the pressure ratio of hot gas expander 150 could be increased to raise its power output and to exhaust air near or below ambient temperature.

Likewise the temperature of the ORC fluid entering ORC expander 135 could be adjusted based on the flow rate and specific heat of the hot heat transfer fluid from energy storage system 245. If the hot heat transfer fluid is molten salt, it may be desirable to raise the temperature of the working fluid entering ORC Heater 230 above the freezing point of the salt to avoid its solidification. This can be achieved using scavenge heater 275, or by employing an intermediate heat transfer fluid, such as a thermal oil or steam, to transfer heat from a molten salt to the ORC. FIG. 6A, FIG. 6A-1, and FIG. 6A-2 show a series arrangement, with the hot heat transfer fluid flowing from energy storage system 245 first to heat the regasified air in air heater 140 and then to heat the ORC working fluid in ORC heater 230, but parallel arrangements of air heater 140 and ORC heater 230 may be desirable and used instead.

Rather than discharging the energy stored in the cryogenic liquid using heat from a thermal energy storage system as in FIG. 6A, FIG. 6A-1, and FIG. 6A-2, it may be desirable to use heat directly available from another process to warm air in Air Heater 140 and ORC Heater 230. For example, heat in the form of steam may be available from thermal power plants, such as coal, nuclear, or gas fired systems, or from industrial plants such as steel, glass, and cement mills or petrochemical refineries. Steam may be available at a range of pressure and temperature conditions depending on the design and operating characteristics of the mill, refinery or power plant, or the thermal energy storage medium.

Figures 2, 6B:
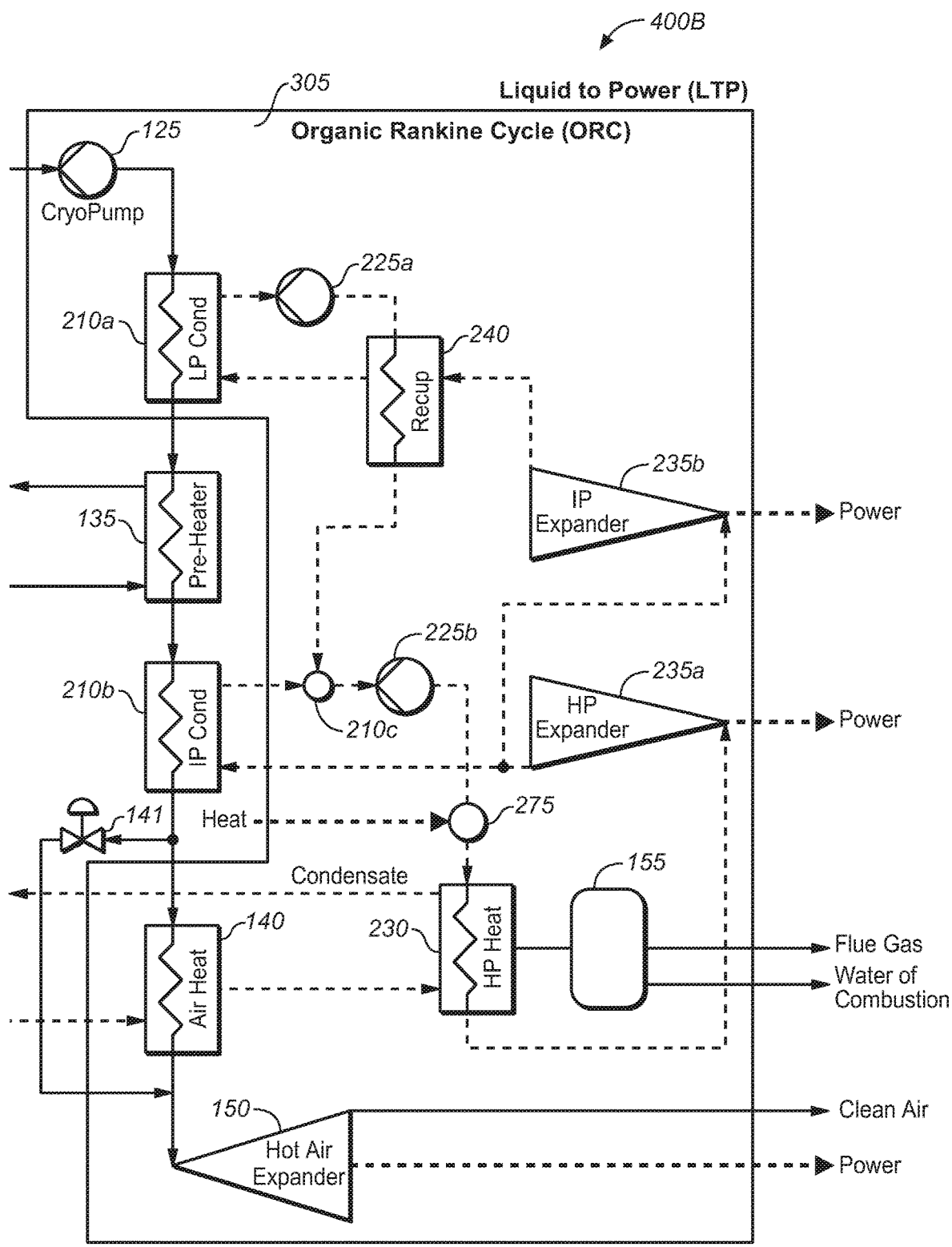

Power plant 400B shown in FIG. 6B, FIG. 6B-1, and FIG. 6B-2 comprises an example steam heat transfer loop 410 driven by pump 415 in which steam produced in heat exchanger 420 with heat from thermal energy storage system 245 is delivered to air heater 140 and ORC heater 230 and returned as condensate. Considering a liquid to power system using 30 kg/s of liquid air as described earlier with respect to FIG. 4, FIG. 4A, and FIG. 4B, for example, approximately 12 kg/s of 500° C. superheated steam could be supplied to air heater 140 at 120 bar. Regasified air enters air heater 140 at about 218° C. and is warmed to about 425° C., absorbing about 6.63 MW of heat and cooling the steam to about 340° C. The steam is desuperheated, and then condenses at temperature of about 322° C., a saturation pressure of about 118 bar, allowing for pressure drops through piping and heat exchangers. The condensate is then subcooled and returns as liquid at about 123° C. The ORC fluid is heated in a countercurrent fashion, with a minimum temperature difference of about 38° C. between the desuperheated steam and the R-170 ORC working fluid.

Steam from other sources, as described above for example, may be used in air heater 140 and ORC heater 230 with a steam heat transfer loop similar to loop 410.

As noted above, concerns about natural gas fuel supplies and costs for combustion turbine power plants can be addressed by liquefying the natural gas for compact storage at the power plant.

Liquefied Natural Gas (LNG) can be produced by any number of conventional well-understood techniques, including mixed refrigerant processes, similar in operation to that used to liquefy air in the cryogenic combined cycle power plants described above. The process pre-treats the gas to remove components such as water or carbon dioxide that could freeze and impede flow and heat transfer through the system. Then gas is cooled in a cryogenic refrigeration process employing compressors, expanders, and heat exchangers arranged to most cost-effectively produce LNG for storage in tanks. In most cases, the LNG is produced for ease of transportation, for example marine transport, or for use as fuel in vehicles.

Conventional liquefaction process conditions are similar for LNG and liquid air, with the boiling points at about −178° C. and −195° C., respectively. The density of LNG is only about one-half (about 450 kg/cu·m. for LNG compared to about 878 kg/cu·m. for liquid air). Higher liquefaction efficiency can be obtained depending on the process and scale, but the liquefaction work will be similar for both LNG and liquid air, about 400 watt-hours per kilogram.

Electric motor driven compressor trains could produce LNG for storing fuel at a power plant using low-cost or excess renewable power. Modular equipment is available that could be used to produce LNG at a power plant. When natural gas is needed to fuel the power plant, it could be drawn from the storage tanks, pumped to pressure and regasified, for example by blowing ambient air over heat exchangers. The pressurized natural gas would then be consumed in a combustion turbine for example.

It might be expected that electric and gas surplus and shortage would be correlated, so this approach could have both economic and operational benefits. If liquefaction was performed during periods of low power demand, electricity might cost as little as $20/MWh, so the incremental fuel cost for liquefaction would be small. However, it is difficult to justify the investment in the LNG equipment for a fuel shortage that occurs rarely. Instead of investing in an LNG production plant, it would be less costly for the power plant owner to install only LNG storage tanks and regasification equipment, with the LNG delivered by road or rail transport from a central facility.

Cryogenic combined cycle power plants comprising combustion turbines as described herein (e.g., with respect to FIGS. 1, 3, and 4) may also be subject to constrained or curtailed supply of natural gas. Because these power plants already include cryogenic liquefaction systems to liquefy and store air, it is practical to incorporate natural gas liquefaction and LNG storage into these plants.

Figures 7, 7B:
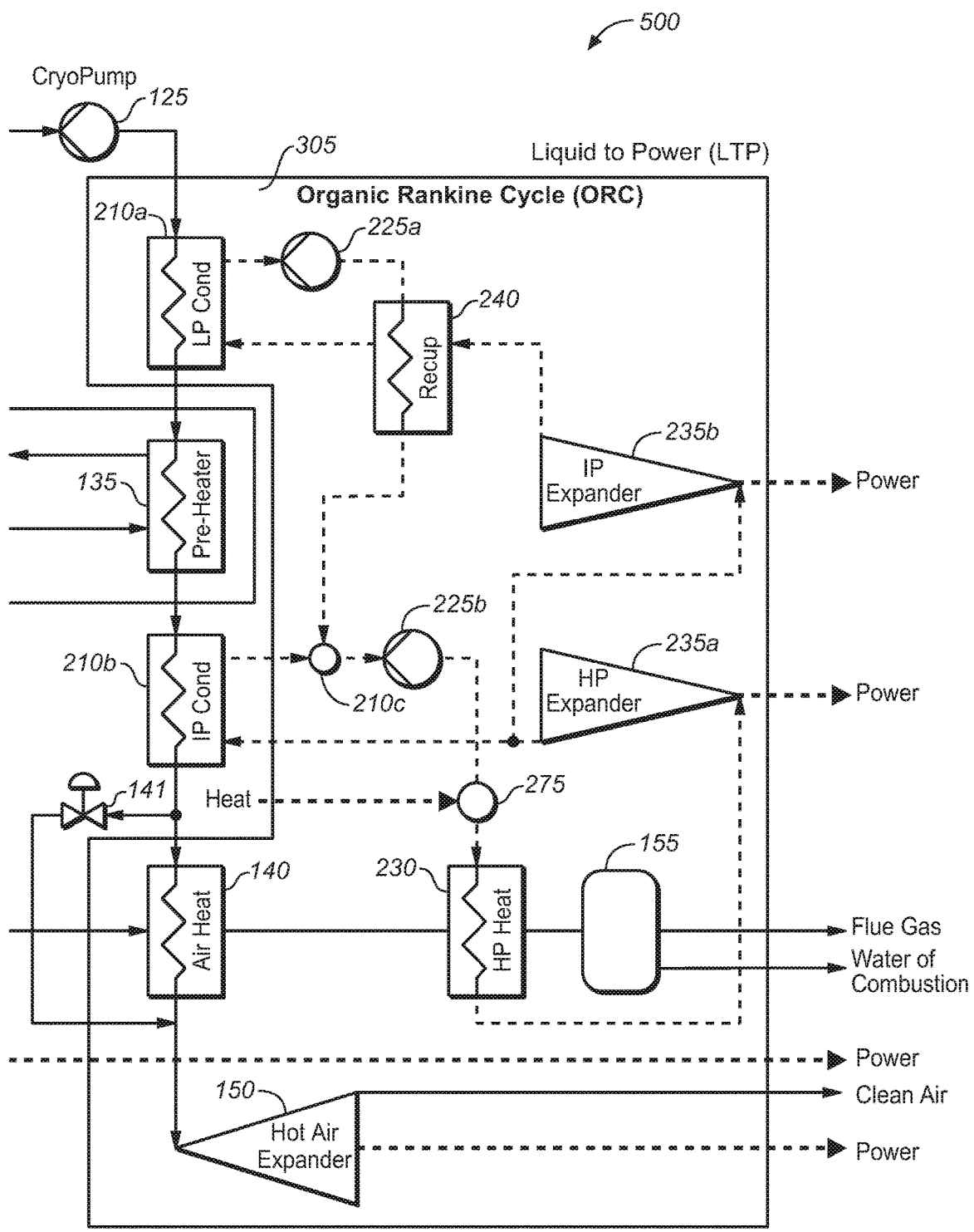
FIG. 7, FIG. 7A, and FIG. 7B schematically depict an example cryogenic combined cycle power plant that liquefies and stores natural gas.
Figure 7A:
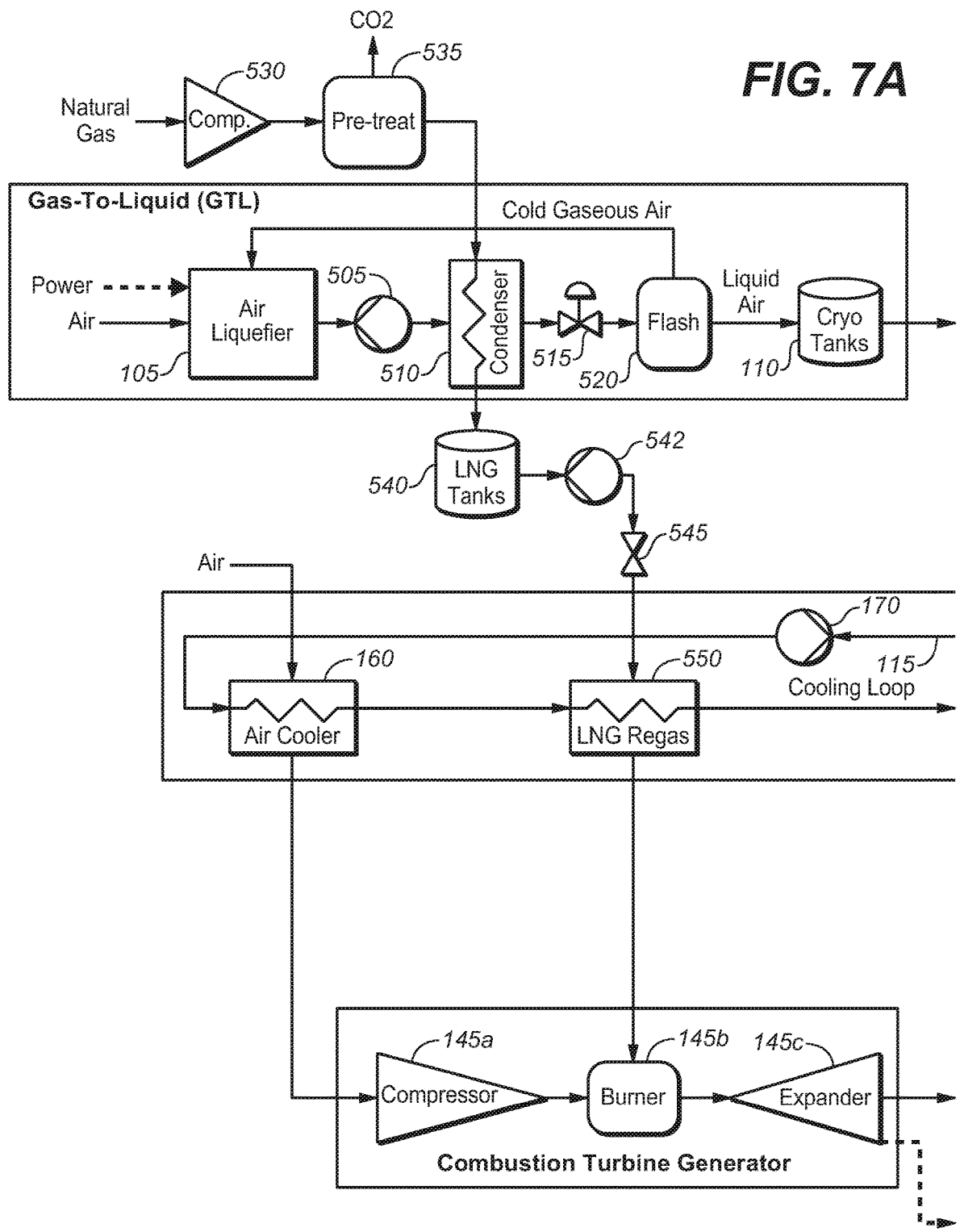

Referring now to FIG. 7, FIG. 7A, and FIG. 7B, cryogenic power plant 500 is similar to power plant 300 of FIG. 4, FIG. 4A, and FIG. 4B, except that power plant 500 includes facilities for liquefying natural gas, storing the LNG, then later regasifying the LNG and combusting it in the combustion turbine. In the embodiment described earlier with respect to the Titan 130 combustion turbine, the ratio of liquid air to liquid natural gas mass flow rate is about 27:1. In other embodiments, the ratio may be more or less, but generally is greater than about 10 to 1.

Cryogenic liquid air at about −195° C. and atmospheric pressure is pressurized by transfer pump 505 to about 5 bar and then flows through natural gas condenser 510, which is a heat exchanger. The liquid air absorbs sensible heat from the natural gas and emerges from condenser 510 still in the liquid phase at a temperature of about −183.5° C., passes through shut-off valve 515, and then expands to near atmospheric pressure in flash tank 520 causing some of the liquid air to flash to vapor (cold gaseous air). The amount of liquid air that flashes to vapor depends on the ratio of LNG and liquid air flowing through condenser 510. The cold gaseous air is recycled from the flash tank to the air liquefier, and the liquid air is discharged from the flash tank to storage tank 110 for atmospheric or near-atmospheric pressure storage.

At the same time, natural gas is compressed by compressor 530 to a pressure of about 16 bar and is then sent to pretreatment unit 535 to reduce carbon dioxide concentration to acceptable levels. Gas may also be delivered from a pipeline at pressure, in which case a pressure let-down station may be used to establish the desired pressure. After removal of carbon dioxide in the pretreatment unit, the natural gas is cooled by heat exchange to near ambient temperature in an aftercooler. The compressed natural gas than enters the condenser 510 to be cooled by heat exchange with the liquid air. Condensed LNG emerges from condenser 510 at a temperature of about −140° C. and is stored within insulated tanks 540 at a pressure of about 15 bar. Valve 545 may be operated to pass LNG further in plant 500 for regasification and combustion as described below.

Figure 8:
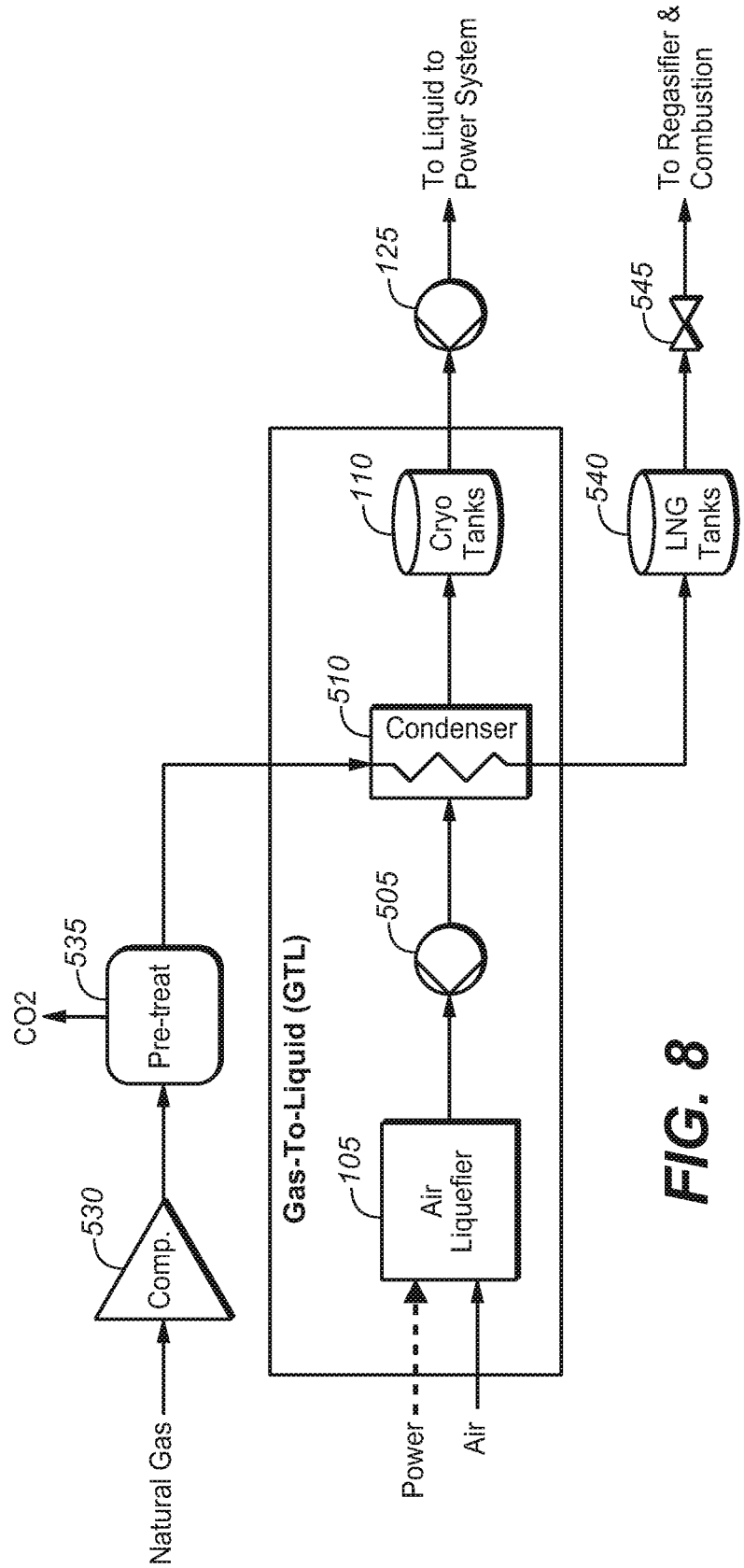
FIG. 8 schematically depicts a variation of the natural gas liquefaction apparatus in the cryogenic power plant of FIG. 7, FIG. 7A, and FIG. 7B.

FIG. 8 depicts an alternative variation of the LNG liquefaction apparatus of plant 500. In this variation the liquid air is not flashed to near atmospheric pressure but is instead stored within insulated tanks 110 at a pressure greater than atmospheric pressure, for example at a pressure of about 4 bar.

Cryogenic liquid storage tanks are commercially available, for example from Chart Industries, in sizes up to 80,000 liters with working pressure of 17 bar. This makes it practical to produce and store LNG at greater than atmospheric pressure in a cryogenic combined cycle power plant as just described. However, the large volume of liquid air could be more cost-effectively stored at or near atmospheric pressure.

LNG would be produced at about the same time that liquid air is produced, typically during periods of low electric cost, such as nights and weekends, or during periods of over-generation from variable renewable energy sources. A ratio of about 3 to 1 may be used for design purposes, i.e., 12 hours of charging the storage and 4 hours of discharging the storage. With this ratio, the system would produce about 10 kg/s of liquid air while charging the storage. Likewise, if natural gas fuel were to be stored, it would be produced at about 0.375 kg/s, for the embodiment described earlier with respect to the Titan 130 combustion turbine.

During discharge operation of plant 500 LNG from tanks 540 is pressurized by pump 542 and flows to LNG regasifier 550 to be vaporized by heat exchange with the heat transfer fluid in cooling loop 115, upstream from liquid preheater 135. In this location, the regasified LNG can be warmed to near ambient temperature, which improves fuel efficiency slightly under high ambient conditions. Alternatively, or in addition, cold LNG could be regasified while being used to relieve heat exchanger pinch point constraints at condensers 210a and 210b in the organic Rankine cycle portion of the power plant. The regasified LNG is then combusted in combustion turbine burner 145b.

In one variation, during discharge operation plant 500 consumes about 30 kg/s of air and 1.0975 kg/s of natural gas so roughly 8.8 cu·m. (about 8,800 liters or about 2325 U.S. gallons) of LNG would be needed per hour of operation of the Solar Turbines Titan 130 turbine described above with respect to power plant 300, for example.

This disclosure is illustrative and not limiting. Further modifications will be apparent to one skilled in the art in light of this disclosure and are intended to fall within the scope of the appended claims.

What is claimed is:

1. A method of storing and recovering energy, the method comprising:
    storing heat from a heat source in a thermal energy storage system;
    producing liquid air in an electrically powered liquefaction process and storing the liquid air;
    pressurizing the liquid air;
    heating at least a portion of the pressurized liquid air to produce gaseous air and then heating the gaseous air, at least in part using heat from the thermal energy storage system in an air heater;
    expanding the heated gaseous air through a first turbine to generate power;
    heating an organic working fluid to convert the organic working fluid from liquid to gaseous phase and then heating the gaseous phase organic working fluid, at least in part with heat from the thermal energy storage system in an organic working fluid heater;
    expanding the heated gaseous organic working fluid through a second turbine to generate additional power;
    condensing in a first condenser a first portion of the gaseous organic working fluid exhaust from the second turbine from gas phase to liquid phase by transferring heat from the first portion of gaseous organic working fluid exhaust from the second turbine to the liquid air or gaseous air during heating of the liquid air or the gaseous air;
    expanding a second portion of the gaseous organic working fluid exhaust from the second turbine through a third turbine to generate additional power; and
    condensing in a second condenser at least a first portion of the gaseous organic working fluid exhaust from the third turbine from gas phase to liquid phase by transferring heat from the first portion of gaseous organic working fluid exhaust from the third turbine to the liquid air or gaseous air during heating of the liquid air or the gaseous air;
    wherein the first portion of the gaseous organic working fluid exhaust from the second turbine is condensed in the first condenser at a first pressure; and
    the first portion of the gaseous organic working fluid exhaust from the third turbine is condensed in the second condenser at a second pressure lower than the first pressure.

2. The method of claim 1, comprising pumping with a first pump the condensed first portion of the organic working fluid exhaust from the third turbine to the first pressure and combining it with the condensed first portion of the organic working fluid exhaust from the second turbine, then pumping with a second pump the combined condensed portions of organic working fluid to a third pressure higher than the first pressure.

3. The method of claim 2, wherein:
    the condensed first portion of the organic working fluid exhaust from the third turbine at the first pressure is a subcooled liquid; and
    the condensed first portion of the organic working fluid exhaust from the second turbine is accompanied by gaseous organic working fluid exhaust from the second turbine that is condensed by contact with the subcooled condensed first portion of the organic working fluid exhaust from the third turbine when the condensed first portion of the organic working fluid exhaust from the third turbine and the condensed first portion of the organic working fluid exhaust from the second turbine are combined.

4. The method of claim 2, wherein prior to being pumped to the third pressure the combined condensed first portion of the organic working fluid exhaust from the third turbine and condensed first portion of the organic working fluid exhaust from the second turbine is a subcooled liquid.

5. The method of claim 2, comprising heating in a recuperator the condensed first portion of the organic working fluid exhaust from the third turbine by heat exchange with gaseous organic working fluid exhaust from the third turbine prior to combining the condensed first portion of the organic working fluid exhaust from the third turbine with the condensed first portion of the organic working fluid exhaust from the second turbine.

6. The method of claim 2, wherein the third pressure is a super critical pressure.

7. The method of claim 1, wherein heating the organic working fluid to convert it from liquid to gaseous phase and heating the gaseous phase organic working fluid comprises heating the organic working fluid with air exhausted from the first turbine.

8. A method of storing and recovering energy, the method comprising:
  compressing a first stream of gaseous air;
  combusting the compressed gaseous air with a gaseous fuel to form a hot gaseous working fluid;
  expanding the hot gaseous working fluid through a first turbine to form an exhaust gas stream and generate power;
  producing liquid air in an electrically powered liquefaction process and storing the liquid air;
  pressurizing the liquid air;
  heating at least a portion of the pressurized liquid air to produce a second stream of gaseous air and then heating the second stream of gaseous air, at least in part using heat from the exhaust gas stream from the first turbine in an air heater;
  expanding the heated second stream of gaseous air through a second turbine to generate additional power;
  heating an organic working fluid to convert the organic working fluid from liquid to gaseous phase and then heating the gaseous phase organic working fluid, at least in part using heat from the exhaust gas stream from the first turbine in an organic working fluid heater;
  expanding the heated gaseous organic working fluid through a third turbine to generate additional power;
  condensing in a first condenser a first portion of the gaseous organic working fluid exhaust from the third turbine from gas phase to liquid phase by transferring heat from the gaseous organic working fluid exhaust to the liquid air or the second stream of gaseous air during heating of the liquid air or the second stream of gaseous air;
  expanding a second portion of the gaseous organic working fluid exhaust from the third turbine through a fourth turbine to generate additional power; and
  condensing in a second condenser at least a first portion of the gaseous organic working fluid exhaust from the fourth turbine from gas phase to liquid phase by transferring heat from the first portion of gaseous organic working fluid exhaust from the fourth turbine to the liquid air or the second gaseous air stream during heating of the liquid air or the second gaseous air stream;
  wherein the first portion of the gaseous organic working fluid exhaust from the third turbine is condensed in the first condenser at a first pressure; and
  the first portion of the gaseous organic working fluid exhaust from the fourth turbine is condensed in the second condenser at a second pressure lower than the first pressure.

9. The method of claim 8, comprising pumping with a first pump the condensed first portion of the organic working fluid exhaust from the fourth turbine to the first pressure and combining it with the condensed first portion of the organic working fluid exhaust from the third turbine, then pumping with a second pump the combined condensed portions of organic working fluid to a third pressure higher than the first pressure.

10. The method of claim 9, wherein:
  the condensed first portion of the organic working fluid exhaust from the fourth turbine at the first pressure is a subcooled liquid; and
  the condensed first portion of the organic working fluid exhaust from the third turbine is accompanied by gaseous organic working fluid exhaust from the third turbine that is condensed by contact with the subcooled condensed first portion of the organic working fluid exhaust from the fourth turbine when the condensed first portion of the organic working fluid exhaust from the fourth turbine and the condensed first portion of the organic working fluid exhaust from the third turbine are combined.

11. The method of claim 9, wherein prior to being pumped to the third pressure the combined condensed first portion of the organic working fluid exhaust from the fourth turbine and condensed first portion of the organic working fluid exhaust from the third turbine is a subcooled liquid.

12. The method of claim 9, comprising heating in a recuperator the condensed first portion of the organic working fluid exhaust from the fourth turbine by heat exchange with gaseous organic working fluid exhaust from the fourth turbine prior to combining the condensed first portion of the organic working fluid exhaust from the fourth turbine with the condensed first portion of the organic working fluid exhaust from the third turbine.

13. A method of operating an organic Rankine cycle power plant, the method comprising:
  heating an organic working fluid to convert the organic working fluid from liquid to gaseous phase and heating the gaseous phase organic working fluid in an organic working fluid heater;
  expanding the heated gaseous organic working fluid through a first turbine to generate power;
  condensing in a first condenser a first portion of the gaseous organic working fluid exhaust from the first turbine from gas phase to liquid phase at a first pressure;
  expanding a second portion of the gaseous organic working fluid exhaust from the first turbine through a second turbine to produce additional power;
  condensing in a second condenser at least a first portion of the gaseous working fluid exhaust from the second turbine from gas phase to liquid phase at a second pressure lower than the first pressure;
  pumping with a first pump the condensed first portion of the organic working fluid exhaust from the second turbine to the first pressure and combining it with the condensed first portion of the organic working fluid exhaust from the second turbine, then pumping with a second pump the combined condensed portions of organic working fluid to a third pressure higher than the first pressure;
  heating the combined condensed portions of organic working fluid at the third pressure in the organic working fluid heater to convert it to gaseous phase and then expanding it through the first turbine.

14. The method of claim 13, wherein:
  the condensed first portion of the organic working fluid exhaust from the second turbine at the first pressure is a subcooled liquid; and
  the condensed first portion of the organic working fluid exhaust from the first turbine is accompanied by gaseous organic working fluid exhaust from the first turbine that is condensed by contact with the subcooled condensed first portion of the organic working fluid exhaust from the second turbine when the condensed first portion of the organic working fluid exhaust from the first turbine and the condensed first portion of the organic working fluid exhaust from the second turbine are combined.

15. The method of claim 13, wherein prior to being pumped to the third pressure the combined condensed first portion of the organic working fluid exhaust from the first turbine and condensed first portion of the organic working fluid exhaust from the second turbine is a subcooled liquid.

16. The method of claim 13, comprising heating in a recuperator the condensed first portion of the organic working fluid exhaust from the second turbine by heat exchange with gaseous organic working fluid exhaust from the second turbine prior to combining the condensed first portion of the organic working fluid exhaust from the first turbine with the condensed first portion of the organic working fluid exhaust from the second turbine.

17. The method of claim 13, wherein the third pressure is a super critical pressure.

18. The method of claim 13, wherein heating the organic working fluid to convert the organic working fluid from liquid to gaseous phase and heating the gaseous phase organic working fluid comprises heating the organic working fluid with heat from the exhaust stream of a combustion turbine.

\* \* \* \* \*